US012631599B2

(12) United States Patent
Piao et al.

(10) Patent No.: US 12,631,599 B2
(45) Date of Patent: May 19, 2026

(54) APPARATUS FOR MEASURING HEIGHT OF FOREIGN SUBSTANCE IN PIPE

(71) Applicants: SEOUL NATIONAL UNIVERSITY R&DB FOUNDATION, Seoul (KR); CENTER FOR ADVANCED META-MATERIALS, Daejeon (KR)

(72) Inventors: Chunguang Piao, Seoul (KR); Jeseung Lee, Seoul (KR); Sung Hyun Kim, Seoul (KR); Yoonyoung Kim, Seoul (KR)

(73) Assignees: SEOUL NATIONAL UNIVERSITY R&DB FOUNDATION, Seoul (KR); CENTER FOR ADVANCED META-MATERIALS, Daejeon (KR)

( * ) Notice: Subject to any disclaimer, the term of this patent is extended or adjusted under 35 U.S.C. 154(b) by 389 days.

(21) Appl. No.: 18/274,701

(22) PCT Filed: Dec. 2, 2022

(86) PCT No.: PCT/KR2022/019504
§ 371 (c)(1),
(2) Date: Jul. 27, 2023

(87) PCT Pub. No.: WO2023/128346
PCT Pub. Date: Jul. 6, 2023

(65) Prior Publication Data
US 2024/0302330 A1      Sep. 12, 2024

(30) Foreign Application Priority Data
Dec. 30, 2021      (KR) ........................ 10-2021-0192695

(51) Int. Cl.
*G01N 29/34*          (2006.01)
*G01N 29/24*          (2006.01)

(52) U.S. Cl.
CPC ......... *G01N 29/34* (2013.01); *G01N 29/2437* (2013.01); *G01N 2291/02854* (2013.01);
(Continued)

(58) Field of Classification Search
CPC ............... G01N 29/34; G01N 29/2437; G01N 2291/02854; G01N 2291/0421;
(Continued)

(56) References Cited

U.S. PATENT DOCUMENTS 3,906,791 A * 9/1975 Lynnworth ............... G01F 1/66
                                                        73/861.29
4,319,490 A     3/1982 Hartmann, Jr.
(Continued)

FOREIGN PATENT DOCUMENTS

JP        2003-139591        5/2003
KR        10-2026362         9/2019

OTHER PUBLICATIONS

International Search Report mailed Mar. 14, 2023 for PCT/KR2022/019504, 4 pages.
(Continued)

*Primary Examiner* — Tarun Sinha

(57)          ABSTRACT

Disclosed is a measuring device for measuring the height of a foreign object in a pipe comprising an ultrasound transmission unit including an ultrasound generator disposed in a first area of an outer surface of a pipe through which fluid passes, and generating ultrasound, and a transmission medium disposed between the ultrasound generator and the first area to transmit the ultrasound to the first area, an ultrasound receiving unit including a receiving medium unit disposed in the second area of the outer surface of the pipe, and consisting of an ultrasound receiver, and a receiving medium disposed between the ultrasound receiver and the second area, and a signal measurer connected to the ultra-
(Continued)

sound receiver for measuring the ultrasound signal received by the ultrasound receiver or a signal corresponding thereto.

16 Claims, 22 Drawing Sheets

(52) U.S. Cl.
CPC ................ *G01N 2291/0421* (2013.01); *G01N 2291/0422* (2013.01)

(58) Field of Classification Search
CPC ........... G01N 2291/0422; G01N 29/04; G01N 29/24; G01N 29/36; G01N 2291/042; G01N 2291/2634; G01B 17/02
See application file for complete search history.

(56) References Cited

U.S. PATENT DOCUMENTS 4,467,659 A * 8/1984 Baumoel .................. G01F 1/667
73/644
2018/0306633 A1 * 10/2018 Bar-Cohen ............. G01N 29/42

OTHER PUBLICATIONS

Piao et al., Non-invasive ultrasonic inspection of sludge accumulation in a pipe, Ultrasonic, Sep. 29, 2021.
Piao et al., Ultrasonic flow measurement using a high-efficiency longitudinal-to-share wave mode-converting meta-slab wedge, Sensors and Actuators A: Physical. May 19, 2020, vol. 310, pp. 1-16.

* cited by examiner n11 n12

FIG. 8

< Comparative example >

PVC : speed of longitudinal wave: $c_{L1} = 2400$ m/s speed of transverse wave: $c_{S1} = 1060$ m/s Water : speed of longitudinal wave: $c_{L2} = 1500$ m/s $$\theta_2 = \sin^{-1}\left(\frac{c_{L2}}{c_{L1}} \sin(\theta_1)\right)$$

Tangent line $$\theta_2 = \sin^{-1}\left(\frac{c_{L2}}{c_{L1}}\sin(\theta_1)\right)$$

$$h = \frac{D}{2}\left(1 - \sin(\theta_2)\right)$$

Measurable minimum height
of foreign substance
$$h = 0.19D$$

PVC : Speed of longitudinal wave : $c_{Z1} = 2400$ m/s

Speed of transverse wave : $c_{S1} = 1060$ m/s

Water : Speed of longitudinal wave : $c_{Z2} = 1500$ m/s $$\theta_2 = \sin^{-1}\left(\frac{c_{Z2}}{c_{Z1}}\sin(\theta_1)\right)$$

Tangent line $$\theta_2 = \sin^{-1}\left(\frac{c_{L2}}{c_{L1}}\sin(\theta_1)\right)$$

$$h = \frac{D}{2}\left(1 - \sin(\theta_2)\right)$$

Theoretically, it is possible to measure foreign substance at any height

| PEEK | | PVC | |
|---|---|---|---|
| $\rho_0$ | 1320 kg/m³ | $\rho_1$ | 1380 kg/m³ |
| $E_0$ | 4.2291 GPa | $E_1$ | 4.2760 GPa |
| $G_0$ | 1.5113 GPa | $G_1$ | 1.5506 GPa |
| $c_{S0}$ | 1070 m/s | $c_{S1}$ | 1060 m/s |
| $c_{L0}$ | 2610 m/s | $c_{L1}$ | 2400 m/s |

$$\theta_{11} = \sin^{-1}\left(\frac{c_{L1}}{c_{L0}}\sin(\theta_0)\right)$$

$$\theta_{12} = \sin^{-1}\left(\frac{D/2}{D/2-t}\sin(\theta_{11})\right)$$

$$\theta_2 = \sin^{-1}\left(\frac{c_{L2}}{c_{L1}}\sin(\theta_{12})\right)$$

$$h = \frac{D-t}{2}(1-\sin(\theta_2))$$

< Comparative example >

FIG. 25

< Comparative example >

FIG. 26

APPARATUS FOR MEASURING HEIGHT OF FOREIGN SUBSTANCE IN PIPE

This application claims the priority of Korean Patent Application No. 10-2021-0192695, filed on Dec. 30, 2021 in the KIPO (Korean Intellectual Property Office), the disclosure of which is incorporated herein entirely by reference. Further, this application is the National Stage application of International Application No. PCT/KR2022/019504, filed on Dec. 2, 2022, which designates the United States and was published in Korean. Each of these applications is hereby incorporated by reference in their entirety into the present application.

TECHNICAL FIELD

The present invention relates to an apparatus and method for detecting foreign substance in a pipe, and more particularly, to a measuring apparatus and method for measuring the height of a foreign substance in a pipe.

BACKGROUND ART

When foreign substance such as sludge accumulates inside various pipes through which fluid passes, the problems such as clogging of the pipes may occur. Therefore, it is necessary to detect foreign substances accumulated in the pipe and take appropriate measures therefor.

As the existing technologies for detecting foreign substances in pipes, there are a method for detecting foreign substances by using a guide wave propagating along the pipe or a method for measuring the thickness of foreign substances in the pipe by using sound waves generated by impacting the pipe. However, when the guide wave is used, it is possible to measure only when the foreign substance in the pipe is in complete contact with the pipe, and since the magnitude of the signal varies depending on the type of foreign substance, it is difficult to accurately measure it. The method for giving shock to the pipe may only be measured when the foreign substance in the pipe is in complete contact with the pipe, and since it is a method for giving an impact, there is a problem that a joint between the pipes or the pipe itself during measurement may be damaged. In addition, according to the prior art, since the measurable height of foreign substance in the pipe is quite high due to the limitation of resolution, there is a problem and limitation that it is difficult to detect or track a small amount of foreign substance having a low height.

In addition, according to the prior art, since the height of the measurable foreign substance in the pipe is quite high due to the limitation of resolution, there is a problem and limitation that it is difficult to detect or track a small amount of foreign substance having a low height.

DISCLOSURE OF THE INVENTION

Technical Problem

The technological object to be achieved by the present invention is to provide a measuring device capable of measuring the height of a foreign substance in a pipe in a non-invasive manner, easily measuring the height of deposition of a foreign substance regardless of the type of foreign substance, and greatly reducing the height of the measurable foreign substance by increasing the resolution.

The problems to be solved by the present invention is not limited to the problems mentioned above, and other problems not mentioned will be understood by those skilled in the art from the description below.

Technical Solution

According to one embodiment of the present invention, there is provided a measuring device for measuring the height of a foreign object in a pipe comprising: an ultrasound transmission unit including an ultrasound generator disposed in a first area of an outer surface of a pipe through which fluid passes and generating ultrasound, and a transmission medium disposed between the ultrasound generator and the first area to transmit the ultrasound to the first area; an ultrasound receiving unit including a receiving medium unit disposed in the second area of the outer surface of the pipe, and consisting of an ultrasound receiver, and a receiving medium disposed between the ultrasound receiver and the second area, and wherein the receiving medium unit transfers the ultrasound transmitted from the first area to the second area through the inside of the pipe to the ultrasound receiver, and the ultrasound receiver receives the ultrasound transmitted through the receiving medium unit; and a signal measurer connected to the ultrasound receiver for measuring the ultrasound signal received by the ultrasound receiver or a signal corresponding thereto, and wherein the transmission medium unit is configured to transmits ultrasound of a shear wave type to the first area; and the receiving medium unit is configured to receive ultrasound of a shear wave type from the second area.

The ultrasound generator may be configured to generate longitudinal wave type ultrasound, and the transmission medium may include a first ultrasound type conversion unit for converting the ultrasound of a longitudinal wave type into ultrasound of a shear wave type.

The first ultrasound type conversion unit may include a meta-structure having a unit pattern structure.

The cross-section of the unit pattern structure may have a modified triangular shape in which three vertex areas are rounded, a Z-shape, or a segmented pattern shape including first and second pattern portions spaced apart from each other and a third pattern portion disposed spaced apart therebetween.

The unit pattern structure may include a through-hole area formed in the transmission medium unit.

The receiving medium unit may include a second ultrasound type conversion unit for converting shear type ultrasound into longitudinal type ultrasound.

The second ultrasound type conversion unit may include a meta-structure having a unit pattern structure.

The ultrasound generator may be configured to generate ultrasound of a shear wave type. In this case, at least one of the transmission medium unit and the receiving medium unit may be entirely made of a uniform medium substance.

The transmission medium unit may have a first wedge structure having a first curved area corresponding to the curved surface of the first area. The receiving medium unit may have a second wedge structure having a second curved area corresponding to the curved surface of the second area.

The transmitting medium unit and the receiving medium unit may be disposed symmetrically with respect to the pipe, and may be disposed to form an interior angle smaller than about 180° in a downward direction of the pipe with setting the pipe as a center.

The pipe may include a first plastic substance. At least one of the transmission medium unit and the receiving medium unit may include a second plastic substance.

The second plastic substance may include, for example, polyether ether ketone (PEEK).

The ultrasound generator may include a piezoelectric element for converting an electrical signal into an ultrasound signal.

The ultrasound receiver may include a piezoelectric element for converting an ultrasound signal into an electrical signal.

Advantageous Effects

According to embodiments of the present invention, the height of foreign substance in a pipe may be measured in a non-invasive manner by transmitting transverse-wave type ultrasound and receiving and analyzing the modified ultrasound, and the height of the foreign substance regardless of the type of foreign substance may be easily measured, and it is possible to implement a measuring device capable of tremendously lowering the height of measurable foreign substance by increasing the resolution.

According to this embodiment of the present invention, as various types of foreign substances in the pipe may be detected without impact or damage to the pipe, and foreign substances having a low height may be easily detected, it may be usefully applied for the maintenance and management of the pipe and facilities including the same.

BRIEF DESCRIPTION OF THE DRAWINGS

FIG. 8 is a cross-sectional diagram illustrating a measuring device for measuring the height of foreign substance in a pipe according to a comparative example.

FIG. 25 is a simulation result illustrating how an output signal is changed when a foreign substance is present in a pipe in the measuring device according to a comparative example.

FIG. 26 and FIG. 27 are diagrams illustrating actual experimental equipment and results for measuring how an output signal is changed when a foreign substance is present in a pipe in a measuring device according to an embodiment of the present invention.

BEST MODE FOR CARRYING OUT THE INVENTION

Hereinafter, the embodiments of the present disclosure will be described in detail with reference to the accompanying drawings.

The embodiments of the present invention to be described below are provided to explain the present invention more clearly to those skilled in the art, and the scope of the present invention is not limited by the following embodiments, and the embodiments may be modified in many different forms.

The terminology used herein is used to describe specific embodiments and is not used to limit the present invention. As used herein, terms in the singular form may include the plural form unless the context clearly dictates otherwise. Also, as used herein, the terms "comprise" and/or "comprising" specifies presence of the stated shape, step, number, action, member, element and/or group thereof; and does not exclude presence or addition of one or more other shapes, steps, numbers, actions, members, elements, and/or groups thereof. In addition, the term "connection" as used herein is a concept that includes not only that certain members are directly connected, but also a concept that other members are further interposed between the members to be indirectly connected.

In addition, in the present specification, when a member is said to be located "on" another member, this includes not only a case in which a member is in contact with another member but also a case in which another member is present between the two members. As used herein, the term "and/or" includes any one and any combination of one or more of those listed items. In addition, as used herein, terms such as "about", "substantially", etc. are used as a range of the numerical value or degree, in consideration of inherent manufacturing and substance tolerances, or as a meaning close to the range. Furthermore, accurate or absolute numbers provided to aid the understanding of the present application are used to prevent an infringer from using the disclosed present invention unfairly.

Hereinafter, embodiments of the present invention will be described in detail with reference to the accompanying drawings. A size or a thickness of areas or portions shown in the accompanying drawings may be slightly exaggerated for clarity of the specification and convenience of description. The same reference numbers indicate the same configuring elements throughout the detailed description.

Figure 1:
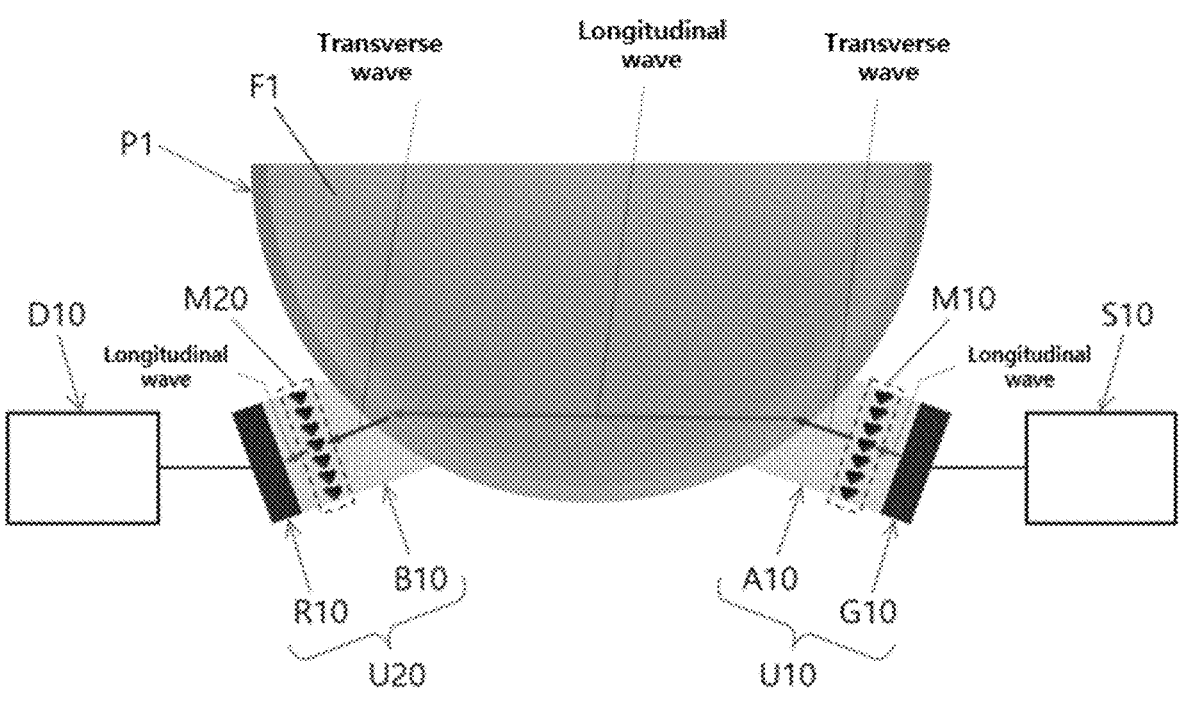
FIG. 1 is a cross-sectional diagram illustrating a measuring device for measuring the height of foreign substances in a pipe according to an embodiment of the present invention.

FIG. 1 is a cross-sectional diagram illustrating a measuring device for measuring the height of foreign substances in a pipe according to an embodiment of the present invention.

Referring to FIG. 1, a measuring device for measuring the height of foreign substance in a pipe according to an embodiment of the present invention may include an ultrasound transmission unit U10 disposed in a first area of an outer surface of a pipe P1 through which a fluid F1 passes and an ultrasound receiving unit U20 disposed in the second area of the outer surface of the pipe P1. For convenience, the pipe P1 is partially illustrated as a pipe having a circular cross section, but in reality, it may have a cylindrical structure (a pipe structure).

The ultrasound transmission unit U10 may include an ultrasound generator G10 generating ultrasound and a transmitting medium A10 disposed between the ultrasound generator G10 and the first area for transmitting the ultrasound to the first area. The ultrasound generator G10 may serve to convert electrical signals into ultrasound signals. The ultrasound generator G10 may be or include an ultrasound transducer for transmission. The ultrasound generator G10 may include a piezoelectric element for converting an electrical signal into an ultrasound signal. In one example, the piezoelectric element may include, for example, oxides or compounds such as barium (Ba), calcium (Ca), titanium (Ti), zirconium (Zr) and manganese (Mn), and a piezoelectric substance such as a PZT (lead zirconate titanate) substance between electrodes facing each other as a non-limiting example. They may have a single-layer structure or may be multi-layered by alternately arranging the electrodes, or may have a three-dimensional shape through a thin film or micro-electromechanical system (MEMS) technology.

The ultrasound receiving unit U20 may include an ultrasound receiver R10 and a receiving medium B10 disposed between the ultrasound receiver R10 and the second area. Here, the receiving medium unit B10 serves to transfer the ultrasound transmitted from the first area to the second area via the inside of the pipe P1 (i.e., the fluid F1) to the ultrasound receiver R10. The ultrasound receiver R10 may receive the ultrasound transmitted through the receiving medium unit B10. The ultrasound receiver R10 may serve to convert ultrasound signals into electrical signals. The ultrasound receiver R10 may be or include an ultrasound transducer for reception. The ultrasound receiver R10 may include a piezoelectric element for converting an ultrasound signal into an electrical signal. For example, the piezoelectric element may be composed of various substances from PZT substance as described above, or may have any shape.

The measuring device may include a signal measurer D10 connected to the ultrasound receiver R10. The signal measurer D10 may serve to measure (detect) the ultrasound signal received by the ultrasound receiver R10 or a signal corresponding thereto. For example, the signal measurer D10 may include an oscilloscope or other measuring devices. In addition, the measuring device may further include a signal generator S10 connected to the ultrasound generator G10. The signal generator S10 may serve to apply a predetermined electrical signal to the ultrasound generator G10. Ultrasound may be generated in the ultrasound generator G10 by the electric signal applied to the ultrasound generator G10. For example, the signal generator S10 may include a predetermined function generator.

According to an embodiment of the present invention, the transmission medium unit A10 may transmit ultrasound of a shear wave type to the first area of the pipe P1. In one embodiment, the ultrasound transmission unit U10 may be configured to transmit ultrasound of a shear wave type from the transmission medium unit A10 to the first area. In addition, the receiving medium unit B10 may receive ultrasound of a shear wave type from the second area of the pipe P1. In this specification, the term, 'width wave' may refer to 'shear wave' or 'transverse'.

In one embodiment, the ultrasound generator G10 may be configured to generate ultrasound of the longitudinal wave type. Here, the longitudinal wave may be referred to as a tensile wave. When the ultrasound generator G10 generates longitudinal wave type ultrasound, the transmission medium unit A10 may include a first ultrasound type conversion unit M10 for converting the ultrasound of a longitudinal wave type into ultrasound of a shear wave type. The first ultrasound type conversion unit M10 may be referred to as a 'first ultrasound mode conversion unit'.

In one embodiment, the first ultrasound type conversion unit M10 may include a meta-structure having a unit pattern structure for mode (type) conversion of ultrasound. The meta-structure may be referred to as a kind of meta substance, and mode conversion of ultrasound may be induced through a substance configuration having a geometric structure without electrical conversion. In addition, the first ultrasound type conversion unit M10 may be referred to as a kind of meta-slab.

In addition, the receiving medium unit B10 may include a second ultrasound type conversion unit M20 for converting shear type ultrasound into longitudinal type ultrasound. The second ultrasound type conversion unit M20 may be referred to as a 'second ultrasound mode conversion unit'. The second ultrasound type conversion unit M20 may include a meta-structure having a unit pattern structure for mode (type) conversion of ultrasound. The meta-structure may be referred to as a kind of meta substance. In addition, the second ultrasound type conversion unit M20 may be referred to as a kind of meta-slab. The meta-slab of the second ultrasound type conversion unit M20 also has an advantage to induce mode conversion of ultrasound through a physical geometry without a complicated electrical circuit.

Shear-wave type ultrasound may be converted into longitudinal-wave type ultrasound by the second ultrasound type conversion unit M20 and may be transmitted to the ultrasound receiver R10. Accordingly, the ultrasound receiver R10 may receive longitudinal wave type ultrasound.

Meanwhile, in the fluid F1 (ex, liquid) in the pipe P1, ultrasound may be transmitted as a longitudinal wave type. Therefore, after the ultrasound of a shear wave type is transmitted from the transmission medium unit A10 to the first area, it may be changed into a longitudinal wave type in the fluid F1, and then may be changed back to the shear type when transmitted to the second area.

The transmission medium unit A10 may have a first wedge structure having a first curved area corresponding to the curved surface of the first area of the pipe P1. For example, the transmission medium unit A10 may have a structure in which a portion of the rectangular pillar structure is cut, and the cut surface may have the first curved area. The first curved area may be disposed to contact (contact with) the first area of the pipe P1. The transmission medium unit A10 may be referred to as a 'first wedge structure'.

Similarly, the receiving medium unit B10 may have a second wedge structure having a second curved area corresponding to the curved surface of the second area of the pipe P1. For example, the receiving medium unit B10 may have a structure in which a portion thereof is cut from a rectangular pillar structure, and the cut surface may have the second curved area. The second curved area may be disposed to contact (contact with) the second area of the pipe P1. The receiving medium unit B10 may be referred to as a 'second wedge structure'.

According to an embodiment of the present invention, the transmission medium unit A10 and the receiving medium unit B10 may be disposed symmetrically with respect to the pipe P1. In this case, the transmission medium unit A10 and the receiving medium unit B10 may be disposed at the same height or substantially the same height with the pipe P1 interposed therebetween. In addition, the transmission medium unit A10 and the receiving medium unit B10 may be arranged to form an interior angle of less than about 180° in a downward direction of the pipe P1 with setting the pipe P1 as the center. Accordingly, the transmission medium unit A10 and the receiving medium unit B10 may be disposed adjacent to the lower area of the pipe P1.

The pipe P1 may include or be formed of a first plastic substance. At least one of the transmission medium unit A10 and the receiving medium unit B10 may include or be formed of a second plastic substance (an example of a solid substance). The second plastic substance may be different from the first plastic substance. The first plastic substance may be, for example, polyvinyl chloride (PVC) or include PVC. The second plastic substance may be, for example, polyether ether ketone (PEEK) or include PEEK. However, the types of the first and second plastic substances are exemplary, and various substances may be employed without being limited to the above. Also, in some cases, the first and second plastic substances may be the same.

The meta substance (meta structure) mentioned in the above description may refer to an engineered substance having properties which do not exist in nature. A meta substance may be composed of a periodic array of engineered unit structures (unit pattern structures), and the properties of the meta substance may be determined by the structure. When meta substances are used, the wave mode (type) of ultrasound (elastic waves) propagating in an elastic medium may be converted from a longitudinal wave (or shear wave) to a shear wave (or longitudinal wave) with an energy efficiency of about 95% or more or about 99% or more. By engineering the unit structure (unit pattern structure) of the meta substance and adjusting its anisotropy, the ultrasound incident on the meta substance as longitudinal waves (or shear waves) may be converted into shear waves (or longitudinal waves) and transmitted through the meta substance. Such meta substances may be referred to as 'anisotropic meta substances'. Ultrasound propagating in multiple medium, such as transmission medium unit-pipe-fluid or fluid-pipe-receiving medium unit, may have different propagation paths depending on the physical properties of the medium and the dimensions of each element, and the detectable range of foreign substances in the pipe may vary according to Snell's law, and the like during the entire propagation process.

According to an embodiment of the present invention, the measurable height range of foreign substance may be greatly expanded by designing the transmission medium unit A10 to transmit ultrasound of a shear wave type to the first area of the pipe P1, and the receiving medium unit B10 to receive ultrasound of a shear wave type from the second area of the pipe P1. That is, it is possible to improve the resolution for foreign substance detection so that the measurable height of the foreign substance in the pipe may be remarkably lowered. According to an embodiment of the present invention, the height of the foreign substance may be easily measured in a wide range regardless of the type of foreign substance inside the pipe by properly designing the ultrasound propagation path while applying a meta-structure (meta substance) while simply installing sensors (i.e., U10 and U20) on the outside of the pipe in a non-invasive manner. In addition, in the case of the meta structure (meta substance), since it may be easily formed with a thin thickness in the medium unit (A10 or B10), there is an advantage that application is easy.

Figure 2:
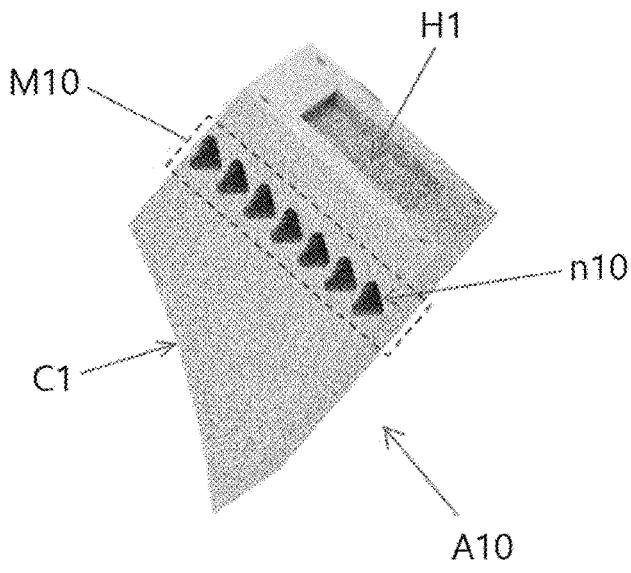
FIG. 2 is a perspective diagram illustrating a transmission medium unit applicable to a measuring device for measuring a height of a foreign substance in a pipe according to an embodiment of the present invention.

FIG. 2 is a perspective diagram illustrating a transmission medium unit applicable to a measuring device for measuring a height of a foreign substance in a pipe according to an embodiment of the present invention.

Referring to FIG. 2, the transmission medium unit A10 which may be applied to the measuring device according to the embodiment of the present invention may have a wedge structure having a first curved area C1 corresponding to the curved surface of the first area of the outer surface of the pipe (P1 in FIG. 1). For example, the transmission medium unit A10 may have a structure in which a portion thereof is cut from a rectangular pillar structure, and the cut surface may have a first curved area C1. The first curved area C1 may be disposed to contact (contact) the first area of the pipe (P1 in FIG. 1). Meanwhile, the groove H1 formed on the rear surface of the transmission medium unit A10 may be an area where an ultrasound generator (G10 in FIG. 1) is installed.

The transmission medium unit A10 may include a first ultrasound type conversion unit M10 for converting a longitudinal type of ultrasound into a shear type of ultrasound. The first ultrasound type conversion unit M10 may include a meta structure (meta substance) having a unit pattern structure n10 for mode (type) conversion of ultrasound. A plurality of unit pattern structures n10 may be regularly arranged. For example, a plurality of unit pattern structures n10 may be arranged in a line, wherein the structures are spaced apart from each other by a predetermined distance in a direction parallel to the ultrasound generator (G10 in FIG. 1).

The unit pattern structure n10 may be a through-hole (through-hole area) having a predetermined shape formed in the transmission medium unit A10. The through-hole may be formed in a direction parallel to the extension direction of the pipe (P1 in FIG. 1). The through-hole may be easily formed by making a hole in the transmission medium unit A10 by using a method such as wire cutting or laser cutting. The through-hole may be an empty area, but may be filled with a substance different from that of the transmission medium unit A10 in some cases.

When the first ultrasound type conversion unit M10 is used, nearly 100% mode conversion between longitudinal and shear waves may be possible. In addition, the target frequency area of ultrasound to be converted between longitudinal waves and shear waves may vary according to the structure, shape, size, and so on of the unit pattern structure n10 constituting the first ultrasound type conversion unit M10.

In the embodiment of FIG. 2, the cross section of the unit pattern structure n10 may have a kind of heart shape or a shape similar thereto. In other words, it may be said that the cross section of the unit pattern structure n10 has a changed triangular shape in which three vertex areas are rounded. Ultrasound of a longitudinal wave type may be converted into ultrasound of a shear wave type through this shape design.

Meanwhile, the receiving medium unit B10 of FIG. 1 may have the same or similar structure and shape as the transmission medium unit A10 described with reference to FIG. 2.

Figure 3:
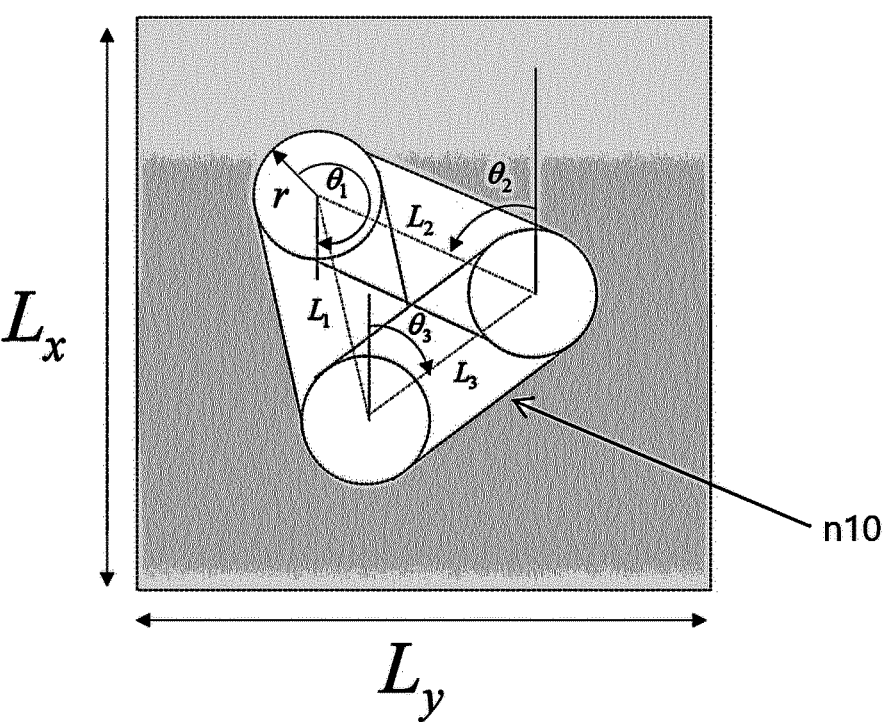
FIG. 3 is a plan diagram illustrating a unit pattern structure n10 of an ultrasound type conversion unit which may be applied to a measuring device for measuring the height of foreign substances in a pipe according to an embodiment of the present invention.

FIG. 3 is a plan diagram illustrating a unit pattern structure n10 of an ultrasound type conversion unit which may be applied to a measuring device for measuring the height of foreign substances in a pipe according to an embodiment of the present invention.

Referring to FIG. 3, and, almost 100% mode conversion between a longitudinal wave and a shear wave may be possible with respect to a specific range of frequencies by designing an optimized shape for the lengths $L_x$ and $L_y$; groove radius r; lengths of the three grooves $L_1$, $L_2$, $L_3$; and rotation angles $\theta_1$, $\theta_2$, and $\theta_3$ of three grooves of unit cells of the ultrasound type conversion unit.

Figure 4:
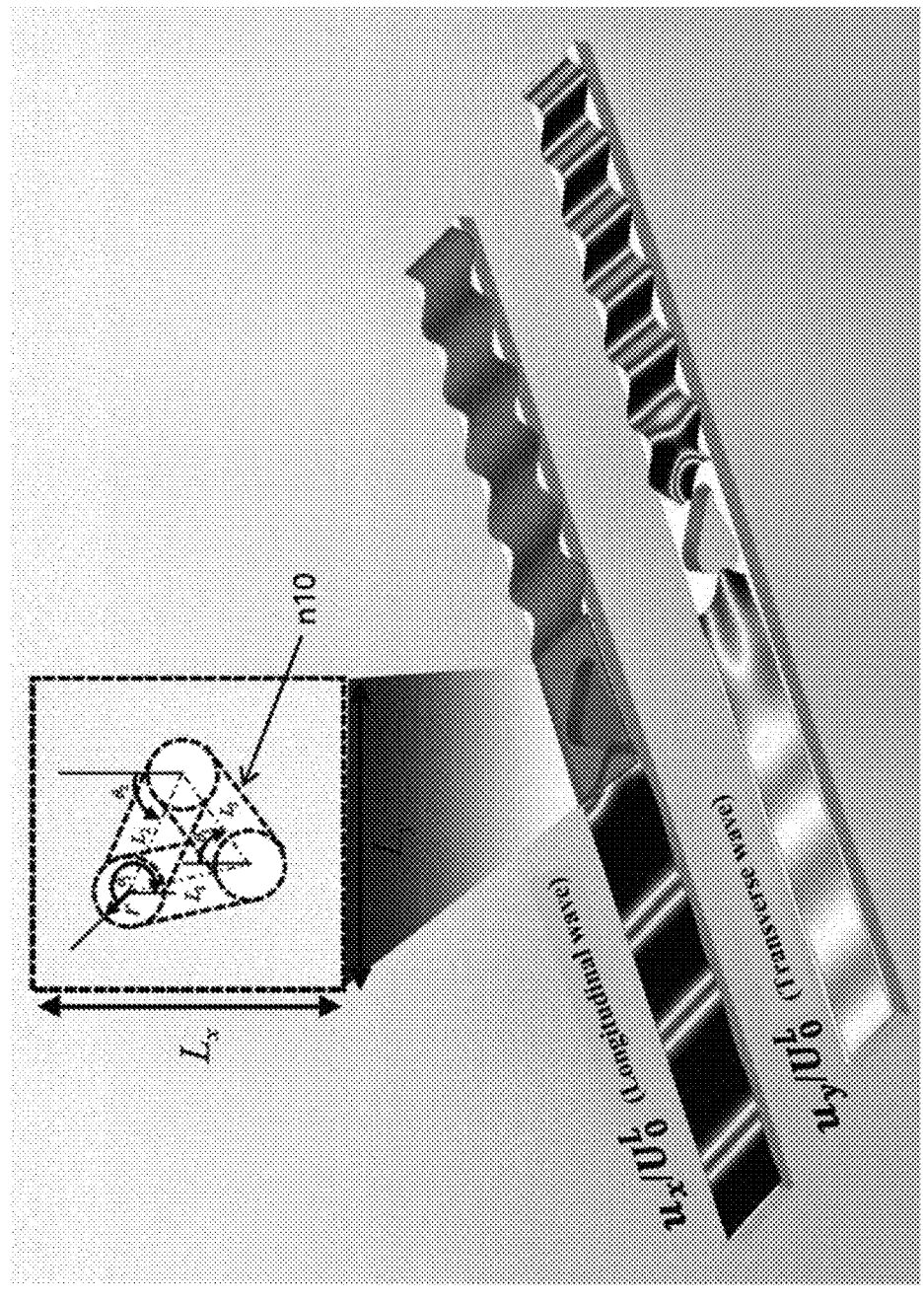
FIG. 4 is simulation data illustrating a mode (type) conversion phenomenon between a longitudinal wave and a shear wave by a unit pattern structure n10 which may be applied to an ultrasound type conversion unit according to an embodiment of the present invention.

FIG. 4 is simulation data illustrating a mode (type) conversion phenomenon between a longitudinal wave and a shear wave by a unit pattern structure n10 which may be applied to an ultrasound type conversion unit according to an embodiment of the present invention.

Referring to FIG. 4, ultrasound of a longitudinal wave type may be converted into ultrasound of a shear wave type while passing through the unit pattern structure n10. Also, in the opposite case, ultrasound of a shear wave type may be converted into ultrasound of a longitudinal wave type while passing through the unit pattern structure n10.

Figures 5, 6A, 6B:
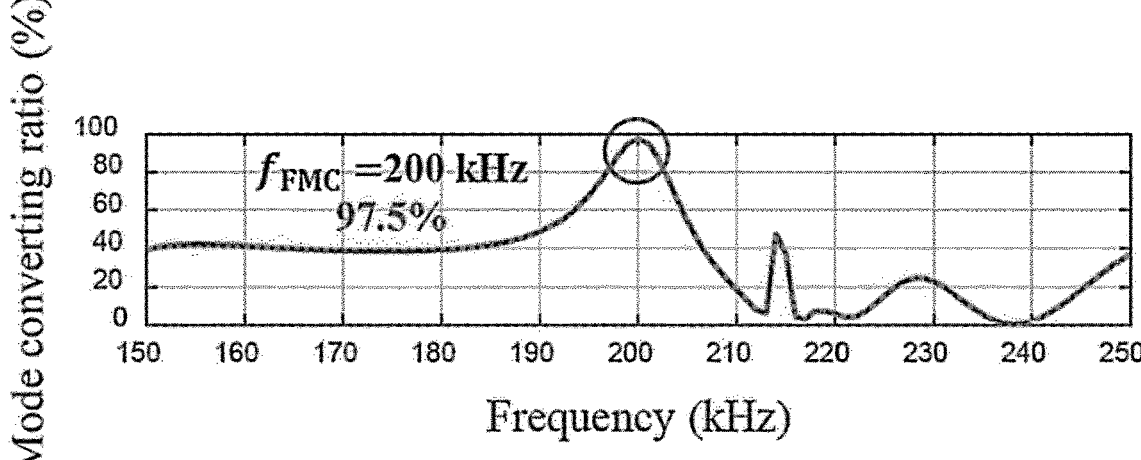
FIG. 5 is a graph illustrating a result obtained by measuring a ratio at which a longitudinal wave is converted into a shear wave by the unit pattern structure of FIG. 4 according to an embodiment of the present invention.
FIG. 6A to FIG. 6C are planar diagrams illustrating various shape designs which may be applied to a unit pattern structure of an ultrasound type conversion unit having a meta-structure according to an embodiment of the present invention.

FIG. 5 is a graph illustrating a result obtained by measuring a ratio at which a longitudinal wave is converted into a shear wave by the unit pattern structure n10 of FIG. 4 according to an embodiment of the present invention.

Referring to FIG. 5, when the frequency of ultrasound is about 200 kHz, the rate at which longitudinal waves are converted into shear waves by the unit pattern structure (n10 in FIG. 4), that is, the mode conversion rate, may be as high as about 97.5%. Accordingly, nearly 100% mode conversion may be possible by using ultrasound having a specific frequency. However, the specific frequency (200 kHz) disclosed herein is only exemplary, and the target frequency range may vary according to design conditions.

The shape of the unit pattern structure n10 described above is not limited to that described in FIGS. 2 to 4 and may be variously changed.

Figures 6C, 7:
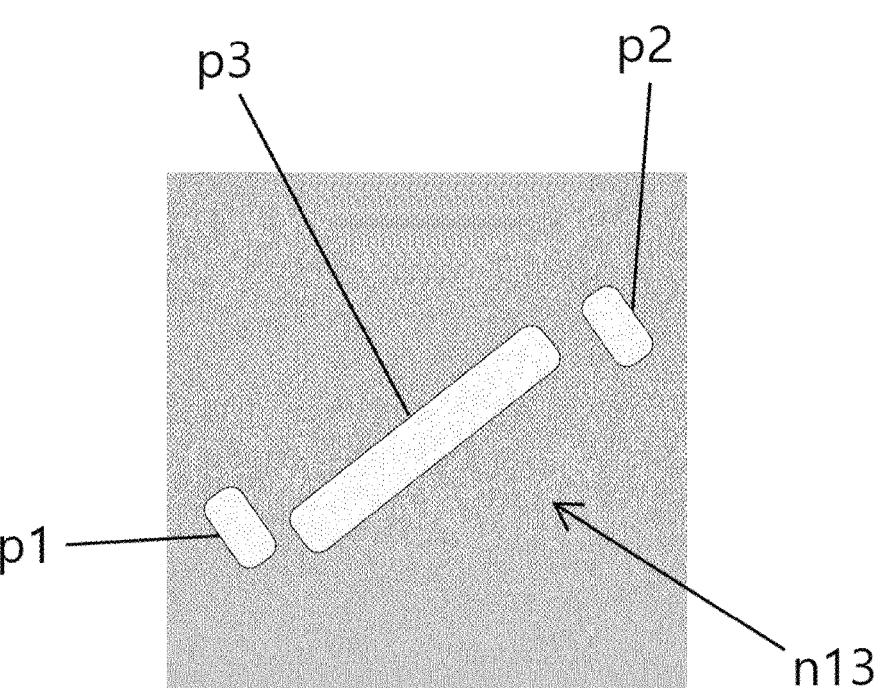
FIG. 7 is a cross-sectional diagram illustrating a measuring device for measuring the height of foreign substances in a pipe according to another embodiment of the present invention.

FIG. 6A to FIG. 6C are planar diagrams illustrating various shape designs which may be applied to a unit pattern structure of an ultrasound type conversion unit having a meta-structure according to an embodiment of the present invention.

Referring to FIG. 6A, the cross section of the unit pattern structure n11 may have a changed triangular shape in which three vertex areas are rounded. The unit pattern structure n11 may have a shape similar to the unit pattern structure n10 described in FIGS. 2 to 4, that is, a heart shape.

Referring to FIG. 6B, the cross section of the unit pattern structure n12 may have a Z-shape or a shape similar thereto.

Referring to FIG. 6C, the cross section of the unit pattern structure n13 may have a segmented pattern shape including first and second pattern portions p1 and p2 spaced apart from each other, and a third pattern portion p3 disposed spaced apart therebetween. The first and second pattern portions p1 and p2 may have a relatively short rod shape extending in parallel with each other, and the third pattern portion p3 may have a rod shape extending in a direction perpendicular to (or substantially perpendicular to) the first and second pattern portions p1 and p2. The length of the third pattern portion p3 may be longer than the respective lengths of the first and second pattern portions p1 and p2. One end of the third pattern portion p3 may be disposed adjacent to one end of the first pattern portion p1, and the other end of the third pattern portion p3 may be disposed adjacent to one end of the second pattern portion p2. This unit pattern structure n13 may be said to have a so-called %-shape or a form similar thereto.

In addition to the shapes illustrated in FIGS. 6A to 6C, the unit pattern structure of the ultrasound type conversion unit may have various modified shapes.

FIG. 7 is a cross-sectional diagram illustrating a measuring device for measuring the height of foreign substances in a pipe according to another embodiment of the present invention.

Referring to FIG. 7, a measuring device for measuring the height of foreign substance in a pipe according to the present embodiment includes an ultrasound transmission unit U11 disposed in a first area of an outer surface of a pipe P1 through which a fluid F1 passes, and an ultrasound receiving unit U21 disposed in the second area of the outer surface of the pipe P1.

The ultrasound transmission unit U11 may include an ultrasound generator G11 generating ultrasound and a transmission medium A11 disposed between the ultrasound generator G11 and the first area to transmit the ultrasound to the first area. The ultrasound generator G11 may serve to convert electrical signals into ultrasound signals. The ultrasound generator G11 may be or include an ultrasound transducer for transmission.

The ultrasound receiving unit U21 may include an ultrasound receiver R11 and a receiving medium B11 disposed between the ultrasound receiver R11 and the second area. Here, the receiving medium unit B11 serves to transfer the ultrasound transmitted from the first area to the second area through the inside of the pipe P1 (i.e., the fluid F1) to the ultrasound receiver R11. The ultrasound receiver R11 may receive the ultrasound transmitted through the receiving medium unit B11. The ultrasound receiver R11 may serve to convert ultrasound signals into electrical signals. The ultrasound receiver R11 may be or include an ultrasound transducer for reception.

The measuring device may include a signal measurer D11 connected to the ultrasound receiver R11. The signal measurer D11 may serve to measure (detect) the ultrasound signal received by the ultrasound receiver R11 or a signal corresponding thereto. In addition, the measuring device may further include a signal generator S11 connected to the ultrasound generator G11. The signal generator S11 may serve to apply a predetermined electrical signal to the ultrasound generator G11.

The transmission medium unit A11 may transmit ultrasound of a shear wave type to the first area of the pipe P1. In other words, the ultrasound transmission unit U11 may be configured to transmit ultrasound of a shear wave type from the transmission medium unit A11 to the first area. In addition, the receiving medium unit B11 may receive ultrasound of a shear wave type from the second area of the pipe P1. Meanwhile, in the fluid F1 (ex, liquid) in the pipe P1, ultrasound may be transmitted in a longitudinal wave type. Therefore, after the ultrasound of a shear wave type is transmitted from the transmission medium unit A11 to the first area, it is changed to a longitudinal wave type in the fluid F1, and then changed back to the shear type when transmitted to the second area.

According to this embodiment, the ultrasound generator G11 may be configured to generate ultrasound of a shear wave type. In one embodiment, the ultrasound generator G11 may be an ultrasound oscillator for shear wave oscillation. In this case, at least one of the transmission medium unit A11 and the receiving medium unit B11 may be entirely made of a uniform medium substance without an 'ultrasound type conversion unit'. The transmission medium unit A11 may not include the first ultrasound type conversion unit M10 as described in FIG. 1, and the receiving medium unit B11 may not include the second ultrasound type conversion unit M20 as described in FIG. 2. In FIG. 7, except that the ultrasound generator G11 generates ultrasound of a shear wave type, and the transmission medium unit A11 and the receiving medium unit B11 do not include an ultrasound type conversion unit, the rest of the configuration is the same as or similar to that of FIG. 1.

As a result of comparing the embodiment of FIG. 1 and the embodiment of FIG. 7, in terms of efficiency and price (cost), and the like, a case that the ultrasound generator G10 generating longitudinal waves is used as shown in FIG. 1 may have advantages as compared with a case that the ultrasound generator generating shear waves is used as shown in FIG. 7. Therefore, the structure of the embodiment shown in FIG. 1 may have advantages over the structure of FIG. 7 in terms of efficiency, price (cost), and the like.

Figure 8:
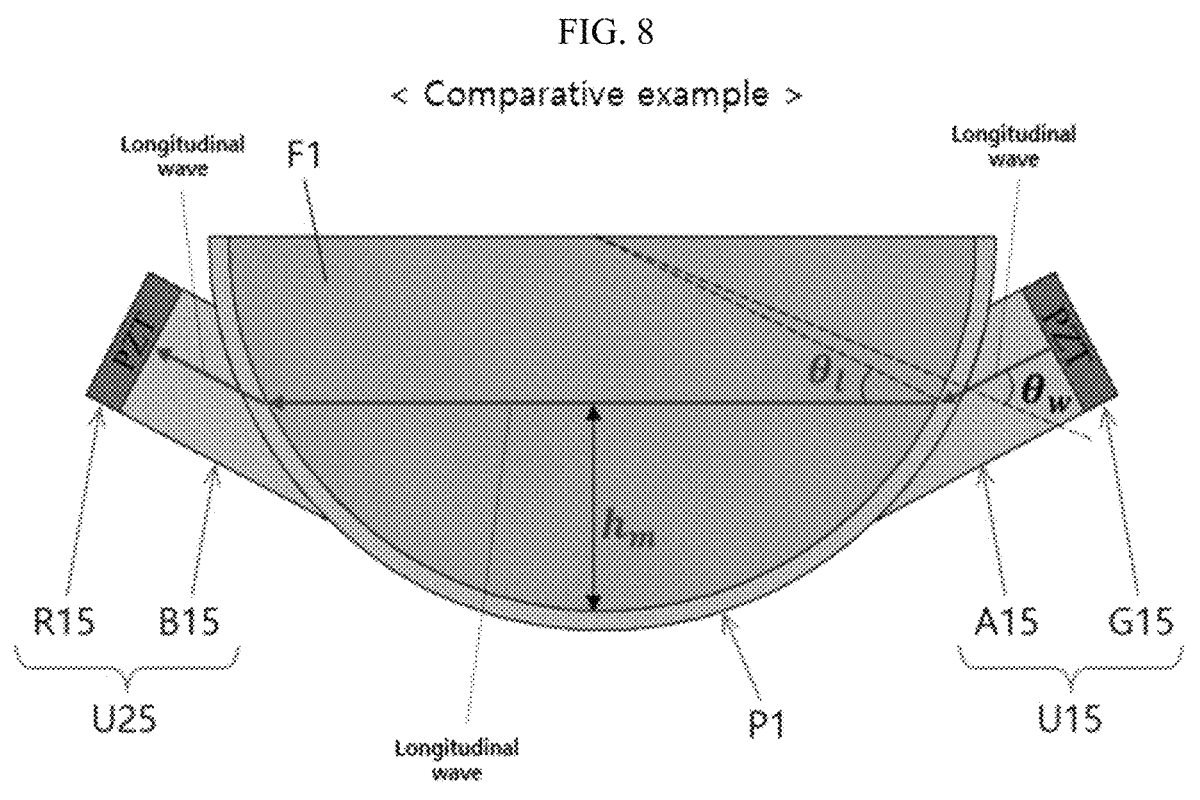

FIG. 8 is a cross-sectional diagram illustrating a measuring device for measuring the height of foreign substance in a pipe according to a comparative example.

Referring to FIG. 8, the measuring device according to the comparative example may include an ultrasound transmission unit U15 disposed in a first area of an outer side of a pipe P1 through which a fluid F1 passes, and an ultrasound receiving unit U25 disposed in the second area of an outer side of the pipe P. The ultrasound transmission unit U15 may include an ultrasound generator G15 generating ultrasound and a transmitting medium A15 disposed between the ultrasound generator G15 and the first area to transmit the ultrasound to the first area. The ultrasound receiving unit U25 may include an ultrasound receiver R15, and a receiving medium B15 disposed between the ultrasound receiver R15 and the second area. Here, the receiving medium unit B15 serves to transfer the ultrasound transmitted from the first area to the second area through the inside of the pipe P1 (ie, the fluid F1) to the ultrasound receiver R15. The ultrasound receiver R15 may receive the ultrasound transmitted through the receiving medium unit B15.

In the comparative example, the ultrasound generator G15 is configured to generate longitudinal wave type ultrasound, the ultrasound of a longitudinal wave type may be transmitted from the transmitting medium unit A15 to the first area, and ultrasound of a longitudinal wave type may be transmitted from the second area to the receiving medium unit B15. Therefore, the measuring device according to the comparative example may be said to be a device using only longitudinal ultrasound. In this case, the transmission medium unit A15 and the receiving medium unit B15 may be arranged to form an interior angle smaller than 180° in the upward direction of the pipe P1 with setting the pipe P1 as the center. The arrangement of the transmission medium unit A15 and the receiving medium unit B15 may be different from the arrangement of the transmission medium units A10 and A11 and the receiving medium units B10 and B11 described in FIGS. 1 and 7.

When using the measuring device according to the comparative example as shown in FIG. 8, it is difficult to detect foreign substances of a low height existing in the pipe P1. In other words, when using the measuring device according to the comparative example, since the measurable minimum height of foreign substance is relatively high, there is a disadvantage in that the detection range of foreign substance is limited.

As in the comparative example, when a ultrasound of a longitudinal wave type is transmitted from the transmission medium unit A15 to the first area, since the longitudinal wave has a very large difference in sound velocity between a solid (i.e., pipe and transmission medium) and a liquid (i.e., fluid in the pipe), the measurable minimum height of foreign substance remarkably increases due to the difference in sound velocity. Therefore, when using the measuring device according to the comparative example, the foreign substance having a relatively low height may not be detected, and preparation and management thereof may be difficult.

However, as in the embodiment of the present invention, when the ultrasound of a shear wave type is transmitted from the transmission medium units A10 and A11 to the first area, as the sound speed of the shear wave is considerably slower than the sound speed of the longitudinal wave, it is possible to greatly reduce the difference in sound velocity between a solid (i.e., pipe and transmission medium) and a liquid (i.e., fluid within the pipe), and ultrasound transmission (propagation) may be possible even at a very low position in the pipe. As a result, the effect that the measurable minimum height of foreign substance is remarkably lowered may be obtained.

Figure 9:
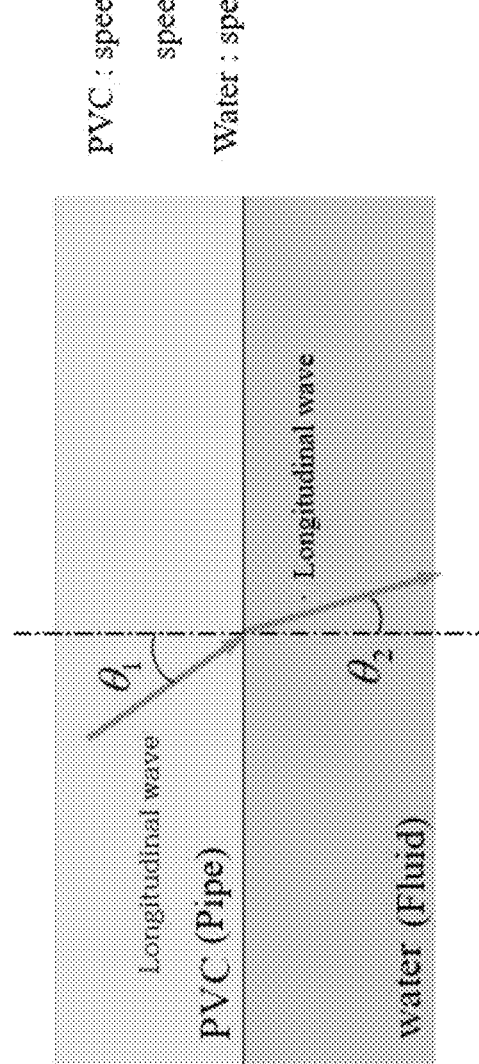
FIG. 9 is a diagram illustrating an incident angle $\theta_1$ and a refraction angle $\theta_2$ of ultrasound when a ultrasound of a longitudinal wave type is incident from a pipe (PVC) to fluid (water).

FIG. 9 is a diagram illustrating an incident angle θ₁ and a refraction angle θ₂ of ultrasound when a ultrasound of a longitudinal wave type is incident from a pipe (PVC) to fluid (water).

Referring to FIG. 9, when a ultrasound of a longitudinal wave type is incident from a pipe (PVC) to a fluid (water), the ultrasound is transmitted as a longitudinal wave type even within the fluid (water). At this time, the incident angle θ₁ and the refraction angle θ₂ of the ultrasound satisfy Snell's law as shown in Equation 1 below.

$$\theta_2 = \sin^{-1}\left(\frac{c_{L2}}{c_{L1}}\sin(\theta_1)\right) \qquad \text{[Equation 1]}$$

Here, $C_{L1}$ is the longitudinal wave velocity in the pipe (PVC), and $C_{L2}$ is the longitudinal wave velocity in the fluid (water). $C_{L1}$ is 2400 m/s and $C_{L2}$ is 1500 m/s. If these values are substituted into Equation 1, the relationship between θ₁ and θ₂ may be illustrated as a graph in FIG. 10.

Figure 10:
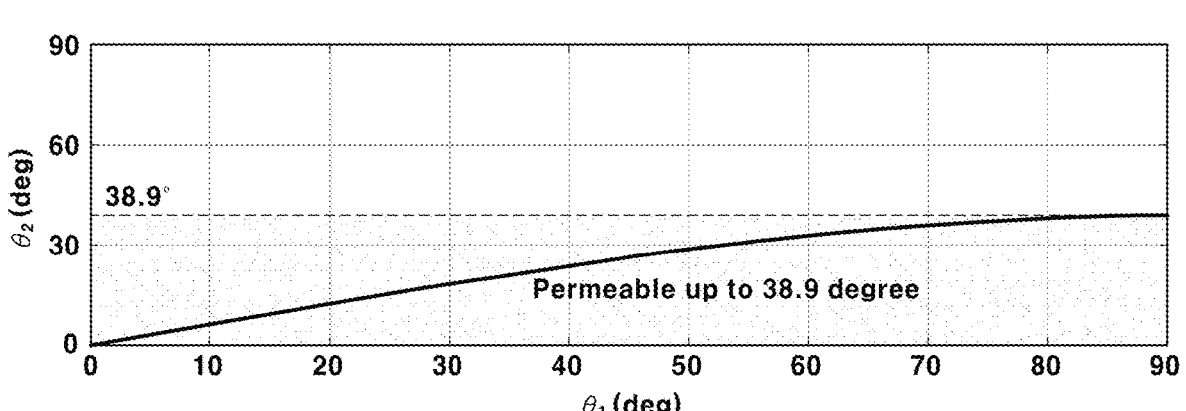
FIG. 10 is a graph illustrating a relationship between an incident angle $\theta_1$ and a refraction angle $\theta_2$ of ultrasound in FIG. 9.

FIG. 10 is a graph illustrating a relationship between an incident angle θ₁ and a refraction angle θ₂ of ultrasound in FIG. 9

Referring to FIG. 10, when the incident angle θ₁ of ultrasound changes from 0° to 90°, the refraction angle θ₂ may not exceed a maximum of 38.9°.

Figure 11:
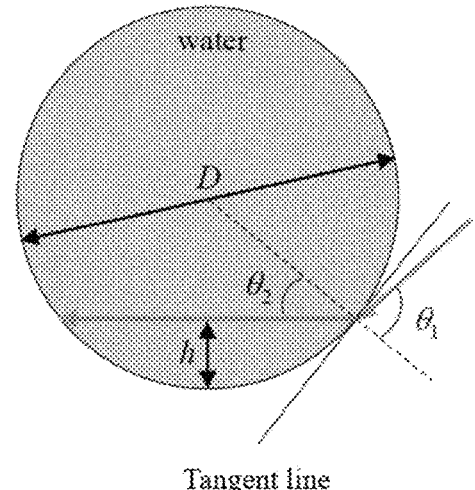
FIG. 11 is a diagram explaining how the angle of incidence $\theta_1$ and the angle of penetration $\theta_2$ are determined in the pipe described with reference to FIG. 9 and how a measurable minimum height of foreign substance is determined.

FIG. 11 is a diagram for explaining how the angle of incidence θ₁ and the angle of penetration θ₂ are determined in the pipe described with reference to FIG. 9 and how a measurable minimum height of foreign substance is determined.

Referring to FIG. 11, when illustrating a line segment connected from the center of the pipe (i.e., the center of the circle on the drawing) to the point of incidence of the ultrasound and the tangent line of the circle at the point of incidence, the angle of incidence θ₁) and the angle of transmission θ₂ may be determined as shown. At this time, the propagation path of ultrasound in the fluid in the pipe may be designed horizontally. There are cases in which foreign substance is deposited non-uniformly (that is, unevenly) in the pipe, and in this case, the height of the foreign substance may be accurately measured only when the propagation path of ultrasound in the fluid is horizontal. Therefore, it is necessary to design the propagation path of ultrasound in a fluid horizontally.

In FIG. 11, θ₁ and θ₂ satisfy Snell's law as in Equation 1 above. At this time, the measurable minimum height h of the foreign substance satisfies Equation 2 below.

$$h = \frac{D}{2}(1 - \sin(\theta_2)) \qquad \text{[Equation 2]}$$

As described above, since the refraction angle θ₂ may not exceed a maximum of 38.9°, the minimum measurable height h of the foreign substance in Equation 2 also has a limit. Calculating this, h=0.19D. That is, foreign substances below 0.19D may not be measured.

Figure 12:
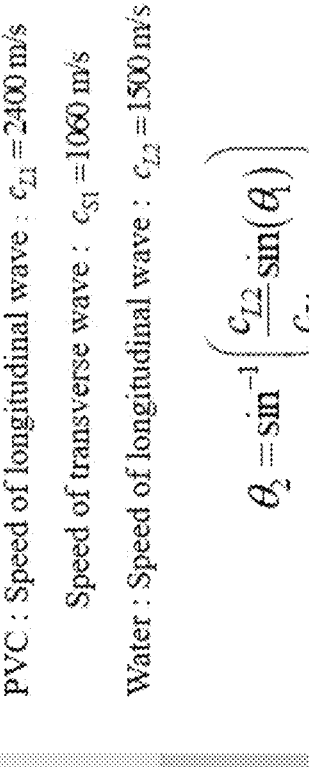
FIG. 12 is a diagram illustrating an incident angle $\theta_1$ and a refraction angle $\theta_2$ of ultrasound when ultrasound of a shear wave type is incident from a pipe (PVC) to a fluid (water).
Figure 12:
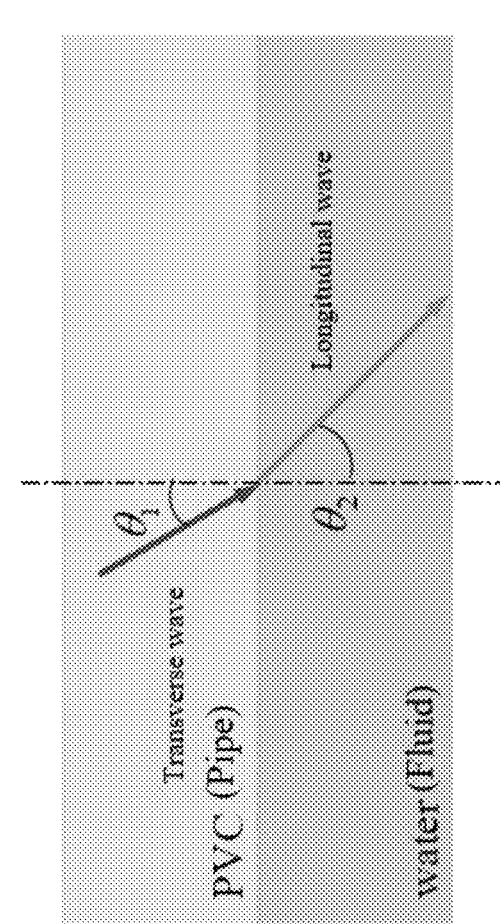

FIG. 12 is a diagram illustrating an incident angle θ₁ and a refraction angle θ₂ of ultrasound when ultrasound of a shear wave type is incident from a pipe (PVC) to a fluid (water).

Referring to FIG. 12, when a shear wave type of ultrasound is incident from a pipe (PVC) to a fluid (water), the ultrasound is propagated as a longitudinal wave type within the fluid. In water, propagation may be possible only in the longitudinal type. At this time, the incident angle θ₁ and the refraction angle θ₂ of the ultrasound satisfy Snell's law as shown in Equation 3 below.

$$\theta_2 = \sin^{-1}\left(\frac{c_{L2}}{c_{S1}}\sin(\theta_1)\right) \qquad \text{[Equation 3]}$$

Here, $C_{S1}$ is the shear wave velocity in the pipe (PVC), and $C_{L2}$ is the longitudinal wave velocity in the fluid (water). $C_{S1}$ is 1060 m/s and $C_{L2}$ is 1500 m/s. If these values are substituted into Equation 3, the relationship between θ₁ and θ₂ may be illustrated as a graph in FIG. 13.

Figure 13:
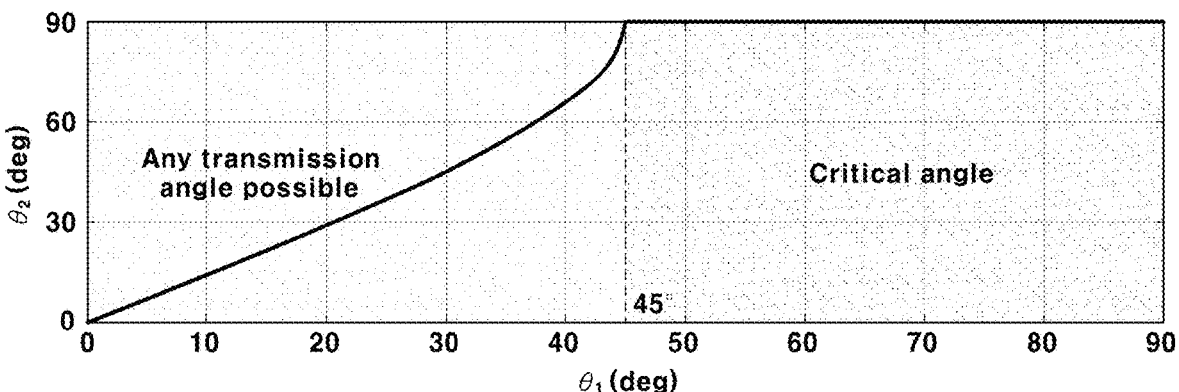
FIG. 13 is a graph illustrating a relationship between an incident angle $\theta_1$ and a refraction angle $\theta_2$ of ultrasound in FIG. 12.

FIG. 13 is a graph illustrating a relationship between an incident angle θ₁ and a refraction angle θ₂ of ultrasound in FIG. 12.

Referring to FIG. 13, when an incident angle θ₁ of ultrasound changes from 0° to 45°, a refraction angle θ₂ may vary from 0° to 90°. That is, all refraction angles may be possible.

Figure 14:
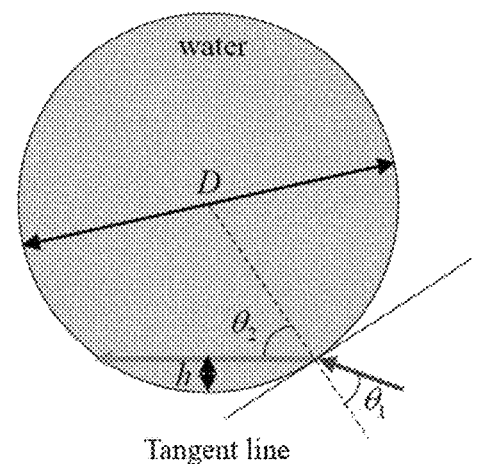
FIG. 14 is a diagram for explaining how the angle of incidence $\theta_1$ and the angle of penetration $\theta_2$ are determined in the pipe described with reference to FIG. 12 and how the minimum height of measurable foreign substance is determined.

FIG. 14 is a diagram for explaining how the angle of incidence θ₁ and the angle of penetration θ₂ are determined in the pipe described with reference to FIG. 12 and how the minimum height of measurable foreign substance is determined.

Referring to FIG. 14, since the penetration angle θ₂ in the pipe may be any angle within the range of 0° to 90°, it is theoretically possible to measure foreign substance at any height. The measurable minimum height h of the foreign substance satisfies Equation 4 below.

$$h = \frac{D}{2}(1 - \sin(\theta_2)) \qquad \text{[Equation 4]}$$

In FIG. 12, since the value of θ₂ may range from 0° to 90°, sin(θ₂) in Equation 4 may have a value from 0 to 1, and h may have a value in the range of 0 to D/2. Accordingly, according to an embodiment of the present invention, it is possible to measure foreign substance at all heights.

The case of FIG. 12 may correspond to an embodiment of the present invention. That is, according to an embodiment of the present invention, the transmission medium unit may transmit ultrasound of a shear wave type to the first area of the pipe, and ultrasound of a longitudinal wave type may be incident to the fluid inside the pipe. According to this embodiment, it is theoretically possible to measure foreign substance at any height in the pipe.

Additionally, referring again to FIG. 13, when the angle of incidence θ1 exceeds 45°, water may not penetrate. Accordingly, the incident angle θ1 may be set in the range of 0° to 45°.

Figure 15:
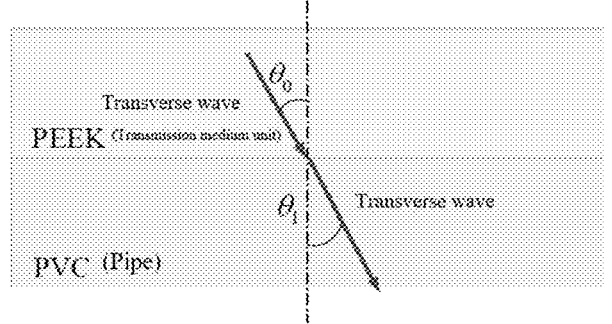
FIG. 15 is a diagram illustrating exemplary substances for a transmission medium unit and piping, and angles of incidence ($\theta_0$) and angles of transmission ($\theta_1$) of shear waves propagating within them.

FIG. 15 is a diagram illustrating exemplary substances for a transmission medium unit and piping, and angles of incidence $\theta_0$ and angles of transmission $\theta_1$ of shear waves propagating within them.

Referring to FIG. 15, the transmission medium unit may be formed of polyether ether ketone (PEEK) as a non-limiting example, and the pipe may be formed of polyvinyl chloride (PVC) as a non-limiting example. Ultrasound of a shear wave type may propagate in the transmission medium unit and the pipe, and at this time, the incident angle $\theta_0$ and the refraction angle $\theta_{01}$ may satisfy Snell's law as shown in Equation 5 below.

$$\theta_1 = \sin^{-1}\left(\frac{c_{S1}}{c_{S0}}\sin(\theta_0)\right) \qquad \text{[Equation 5]}$$

In Equation 5, $C_{S0}$ is the shear wave velocity in the transmission medium unit (PEEK), and $C_{S1}$ is the shear wave velocity in the pipe (PVC). $C_{S0}$ is 1070 m/s and $C_{S1}$ is 1060 m/s. If these are substituted into Equation 5 and the relationship between $\theta_0$ and $\theta_1$ is denoted, it may be as shown in FIG. 16.

Figure 16:
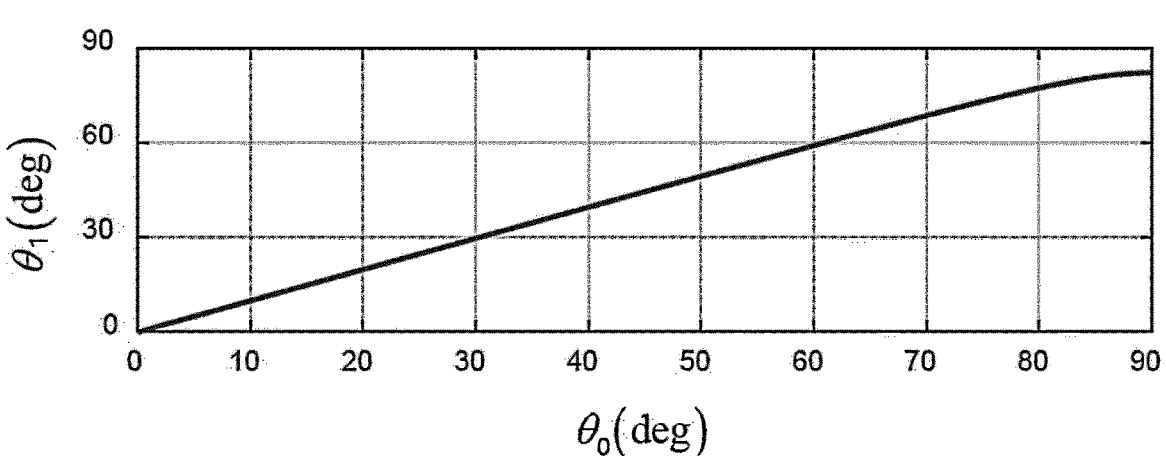
FIG. 16 is a graph illustrating a relationship between an incident angle $\theta_0$ and a refraction angle $\theta_1$ of ultrasound in FIG. 15.

FIG. 16 is a graph illustrating a relationship between an incident angle $\theta_0$ and a refraction angle $\theta_1$ of ultrasound in FIG. 15.

Referring to FIG. 16, when a shear wave is incident from the transmission medium PEEK to the pipe PVC, an incident angle $\theta_0$ and a refraction angle $\theta_1$ may be substantially the same. Therefore, in this case, it may be very convenient to calculate and design the path of the ultrasound. Also, as indicated in FIG. 15, the density $\rho_0$ of PEEK and the density $\rho_1$ of PVC may be very similar, and other physical properties may also be very similar.

Figure 17:
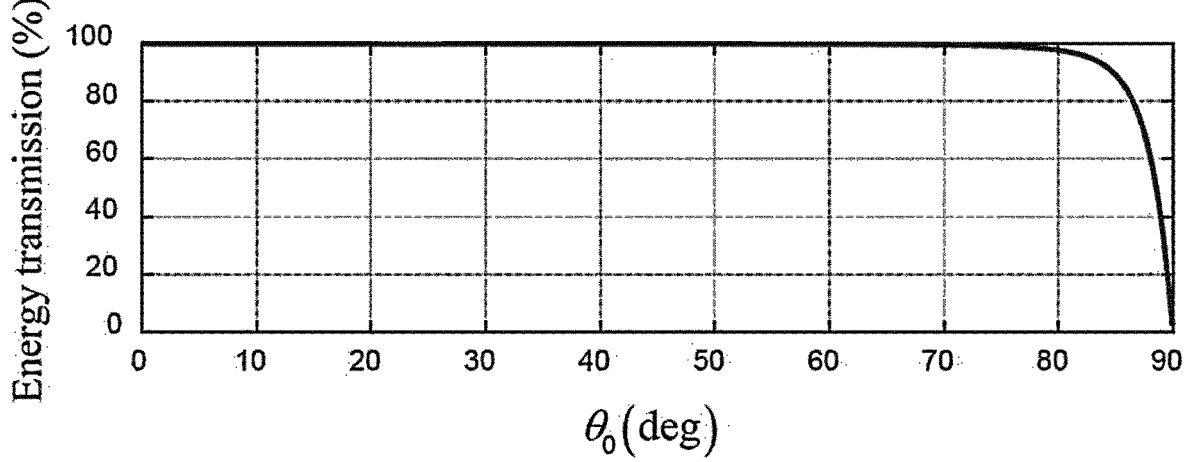
FIG. 17 is a graph illustrating the result obtained by evaluating the energy transmittance (%) according to the change in the incident angle $\theta_0$ of ultrasound in FIG. 15.

FIG. 17 is a graph illustrating the calculation result obtained by evaluating the energy transmittance (%) according to the change in the incident angle $\theta_0$ of ultrasound in FIG. 15.

Referring to FIG. 17, it may be seen that the energy transmittance is almost 100% in a wide incident angle $\theta_0$ range. This may mean that almost 100% is transmitted at the interface between PEEK and PVC when incident as a shear wave.

As described in FIGS. 16 and 17, when using a transmission medium formed of PEEK, the incidence angle $\theta_0$ and the refraction angle $\theta_1$ are almost the same, and an advantage that the energy transmittance is 100% in a wide range of the angle of incidence $\theta_0$ may be obtained.

Figure 18:
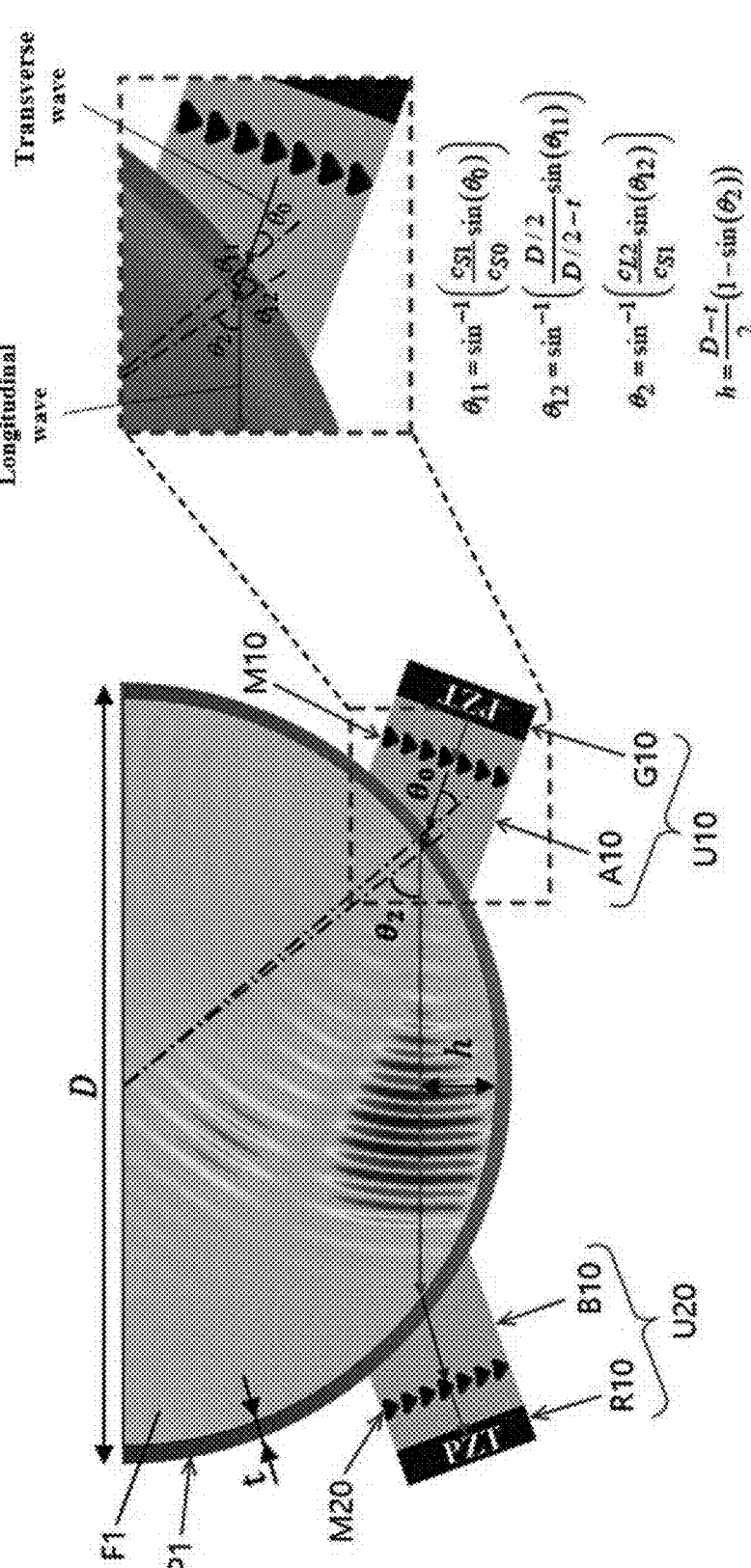
FIG. 18 is a diagram for explaining a relationship between an incident angle and a penetration angle of ultrasound in a transmission medium unit, a pipe, and fluid of a measuring device according to an exemplary embodiment having the structure of FIG. 1.

FIG. 18 is a diagram for explaining a relationship between an incident angle and a penetration angle of ultrasound in a transmission medium unit, a pipe, and fluid of a measuring device according to an exemplary embodiment having the structure of FIG. 1. Here, $\theta_0$ is the incident angle from the transmission medium A10 to the pipe P1, $\theta_{11}$ is the refraction angle from the pipe P1, $\theta_{12}$ is the incident angle from the pipe P1 to the fluid F1, and $\theta_2$ is a refraction angle in fluid F1. At this time, a shear wave is incident on the pipe P1 and is transmitted as a longitudinal wave in the fluid F1.

In FIG. 18, the relational expression between $\theta_0$ and $\theta_{11}$, the relational expression between $\theta_{11}$ and $\theta_{12}$, the relational expression between $\theta_{12}$ and $\theta_2$, and the measurable minimum height h of the foreign substance may be as shown in Equation 6 below. Here, t represents the thickness of the pipe P1, D represents the outer diameter of the pipe P1.

$$\theta_{11} = \sin^{-1}\left(\frac{c_{S1}}{c_{S0}}\sin(\theta_0)\right) \qquad \text{[Equation 6]}$$

$$\theta_{12} = \sin^{-1}\left(\frac{D/2}{D/2 - t}\sin(\theta_{11})\right)$$

$$\theta_2 = \sin^{-1}\left(\frac{c_{L2}}{c_{S1}}\sin(\theta_{12})\right)$$

$$h = \frac{D - t}{2}(1 - \sin(\theta_2))$$

Figure 19:
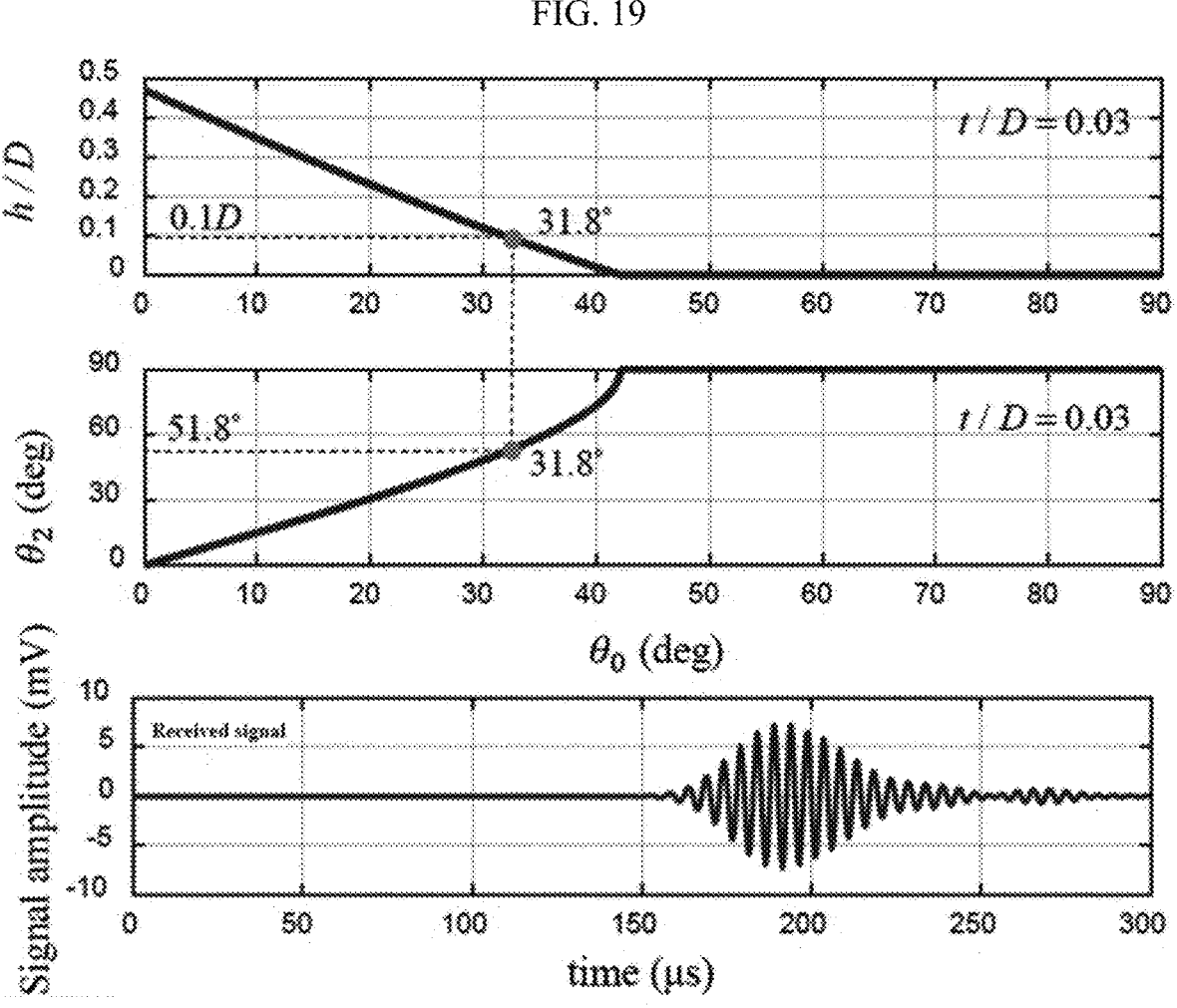
FIG. 19 is a graph illustrating changes in h/D values and $\theta_2$ according to changes in $\theta_0$ and changes in an output signal (i.e., an output voltage) of the ultrasound receiver R10 according to time in FIG. 18. At this time, t/D was 0.03.

FIG. 19 is a graph illustrating changes in h/D values and $\theta_2$ according to changes in $\theta_0$ and changes in an output signal (i.e., an output voltage) of the ultrasound receiver R10 according to time in FIG. 18. At this time, t/D was 0.03.

Referring to FIG. 19, when the incident angle was 31.8°, the minimum measurable height h of the foreign substance was 0.1D, and at this time, the refraction angle $\theta_2$ in the fluid (water) was 51.8°. In addition, it was confirmed that the received signal was detected in the ultrasound receiver (R10 in FIG. 18) at a height corresponding to 0.1D.

Figure 20:
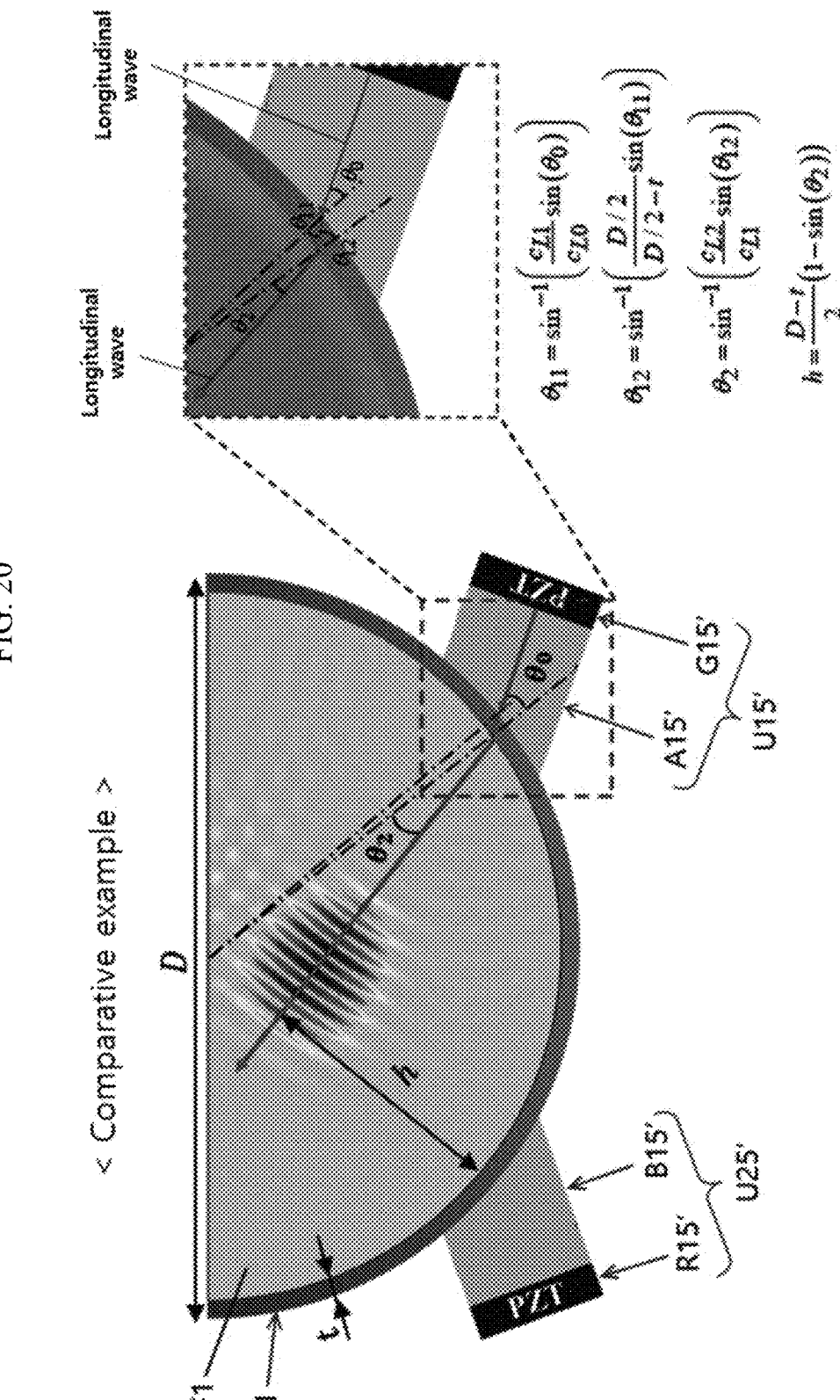
FIG. 20 is a diagram for explaining the relationship between the incident angle and the refraction angle of ultrasound in the transmission medium unit, the pipe, and the fluid of the measuring device according to the comparative example, when the ultrasound transmission unit and the ultrasound reception unit are arranged in the same position as in the embodiment.

FIG. 20 is a diagram for explaining the relationship between the incident angle and the refraction angle of ultrasound in the transmission medium unit A15', the pipe P1, and the fluid F1 of the measuring device according to the comparative example, when the ultrasound transmission unit U15' and the ultrasound reception unit U25' are arranged in the same position as in the embodiment. Here, $\theta_0$ is the incident angle from the transmission medium A15' to the pipe P1, $\theta_{11}$ is the refraction angle from the pipe P1, $\theta_{12}$ is the incident angle from the pipe P1 to the fluid F1, and $\theta_2$ is It represents the refraction angle in the fluid F1. At this time, a longitudinal wave is incident on the pipe P1 and transmitted as a longitudinal wave in the fluid F1. Unexplained reference numeral R15' denotes an ultrasound receiver, and B15' denotes a receiving medium unit.

In FIG. 20, the relational expression between $\theta_0$ and $\theta_{111}$, the relational expression between $\theta_{11}$ and $\theta_{12}$, the relational expression between $\theta_{12}$ and $\theta_2$, and the measurable minimum height h of the foreign substance may be as shown in Equation 7 below. Here, t represents the thickness of the pipe P1, and D represents the outer diameter of the pipe P1.

$$\theta_{11} = \sin^{-1}\left(\frac{c_{L1}}{c_{L0}}\sin(\theta_0)\right) \qquad \text{[Equation 7]}$$

$$\theta_{12} = \sin^{-1}\left(\frac{D/2}{D/2 - t}\sin(\theta_{11})\right)$$

$$\theta_2 = \sin^{-1}\left(\frac{c_{L2}}{c_{L1}}\sin(\theta_{12})\right)$$

$$h = \frac{D - t}{2}(1 - \sin(\theta_2))$$

Figure 21:
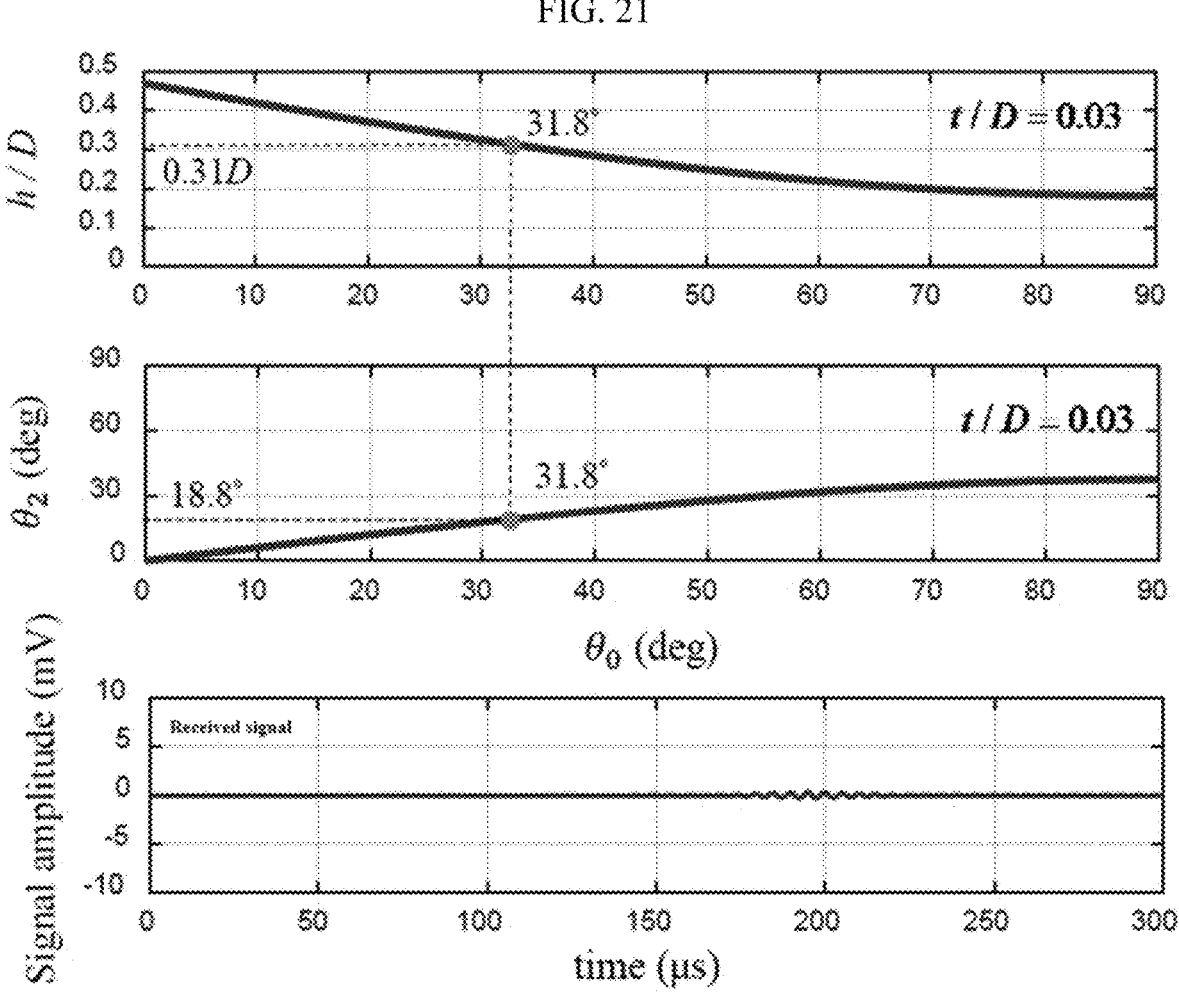
FIG. 21 is a graph illustrating changes in h/D values and $\theta_2$ according to changes in $\theta_0$ in FIG. 20 and changes in an output signal (i.e., an output voltage) from the ultrasound receiver over time.

FIG. 21 is a graph illustrating changes in h/D values and $\theta_2$ according to changes in $\theta_0$ in FIG. 20 and changes in an output signal (i.e., an output voltage) from the ultrasound receiver R15' over time. At this time, t/D was 0.03.

Referring to FIG. 21, when the incident angle was 31.8°, the same as in the case of FIG. 19, the measurable minimum height h of the foreign substance was about 0.31 D, and at this time, the refraction angle $\theta_2$ in the fluid (water) was 18.8°. Compared to the result of FIG. 19, since $\theta_2$ is much smaller than that of the embodiment (FIG. 18), the ultrasound may not travel in the horizontal direction in the fluid and proceed considerably upward as shown in FIG. 20. Therefore, in this case, a problem arises that the function of measuring the height of the foreign substance may not be performed. Therefore, as shown in the third graph of FIG. 21, it was confirmed that the received signal was not detected by the ultrasound receiver (R15' in FIG. 20) when $\theta_2$ was 18.8°.

Therefore, in the case of the comparative example, the ultrasound transmission unit U15' and the ultrasound reception unit U25' may not be disposed at the same location as in the embodiment, and need to be disposed as shown in FIG. 8 described above.

Figure 22:
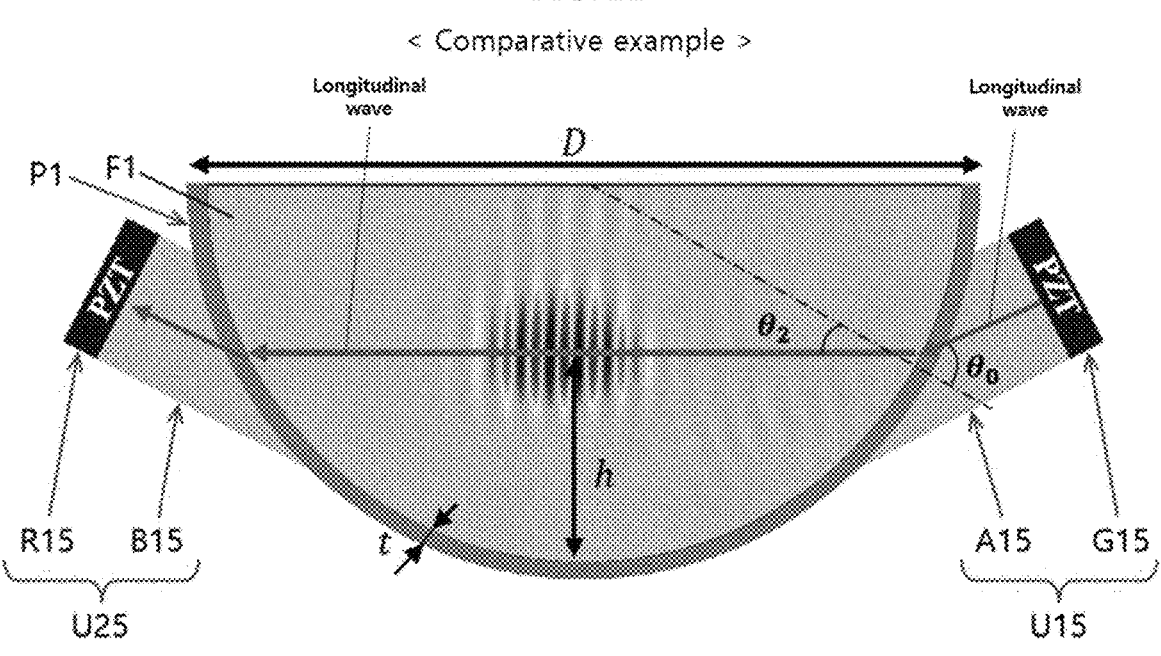
FIG. 22 is a diagram for explaining a relationship between an incident angle and a refraction angle of ultrasound in the transmission medium unit, the pipe and the fluid of the measuring device according to the comparative example having the structure of FIG. 8

FIG. 22 is a diagram for explaining a relationship between an incident angle and a refraction angle of ultrasound in the transmission medium unit A15, the pipe P1, and the fluid F1 of the measuring device according to the comparative example having the structure of FIG. 8. Here, $\theta_0$ is the incident angle from the transmission medium A15 to the pipe P1, $O_{11}$ is the refraction angle from the pipe P1, $\theta_{12}$ is the incident angle from the pipe P1 to the fluid F1, and $\theta_2$ is the refraction angle in fluid F1. At this time, a longitudinal wave is incident on the pipe P1 and transmitted as a longitudinal wave in the fluid F1.

Figure 23:
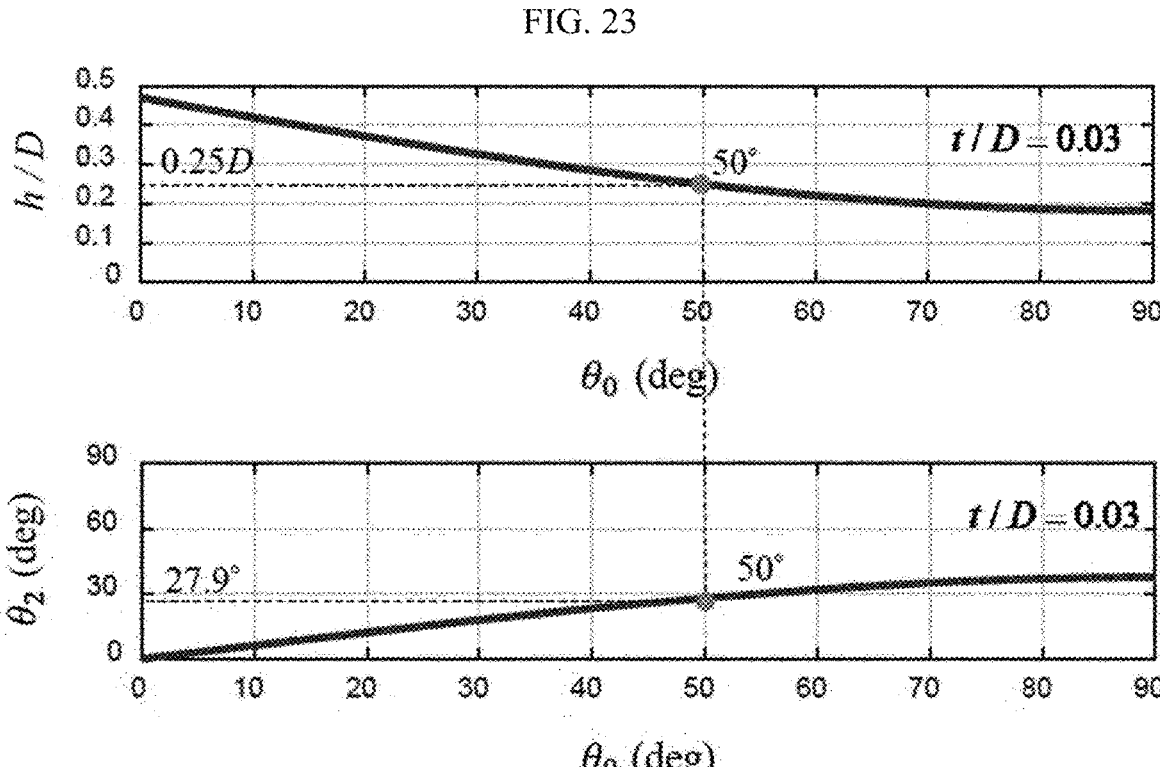
FIG. 23 is a graph illustrating a change in h/D value and a change in θ2 according to a change in $\theta_0$ in FIG. 22.

FIG. 23 is a graph illustrating a change in h/D value and a change in $\theta_2$ according to a change in $\theta_0$ in FIG. 22. At this time, t/D was 0.03.

Referring to FIG. 23, when the incident angle $\theta_0$ was 50°, the minimum measurable height h of the foreign substance was 0.25D, and at this time, the refraction angle $\theta_2$ in the fluid (water) was 27.9°. In this case, it is possible to measure ultrasound since ultrasound travel in a horizontal direction in the fluid, but there is a problem that the minimum measurable height h of the foreign substance is tremendously increased. Theoretically, as described in FIG. 11, as it is possible to measure up to a height of 0.19D, but in practice, there are problems such as a decrease in transmittance and difficulty in installation, it may not be easy to measure a foreign substance with a height of 0.19D.

Figure 24:
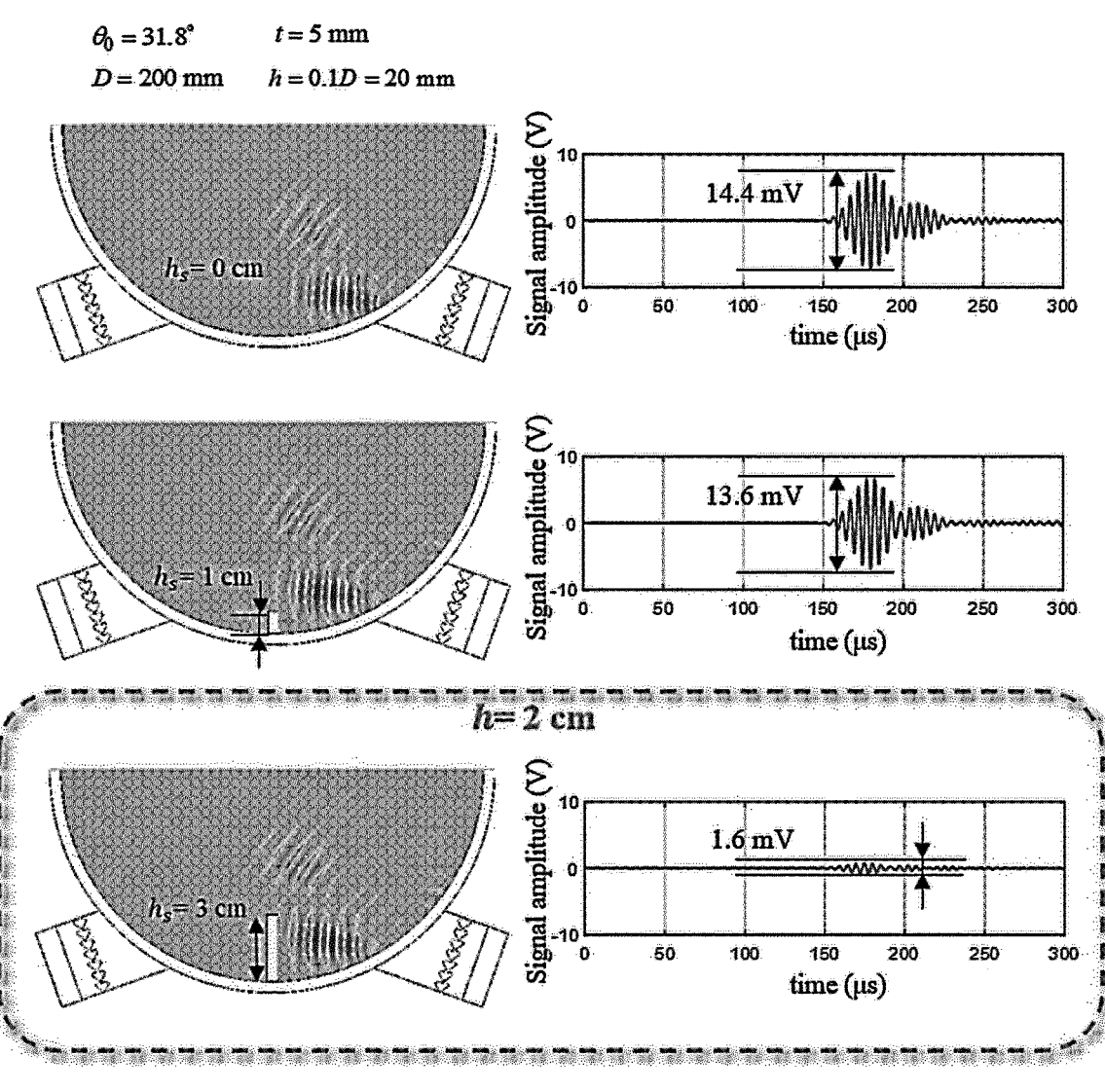
FIG. 24 is a simulation result illustrating how an output signal is changed when a foreign substance is present in a pipe in the measuring device according to an embodiment of the present invention.

FIG. 24 is a simulation result illustrating how an output signal is changed when a foreign substance is present in a pipe in the measuring device according to an embodiment of the present invention. Here, the measuring device according to the above embodiment has a structure as shown in FIG. 18. At this time, as an example, the angle of incidence $\theta_0$ is 31.8°, the thickness t of the pipe is 5 mm, the outer diameter D of the pipe is 200 mm, and the calculated minimum measurable height h of the foreign substance is 0.1 D, that is, 20 mm. In FIG. 24, $h_s$ represents the height of the actual foreign substance.

Referring to FIG. 24, it may be confirmed that a signal is normally output when there is no foreign substance (ie, $h_s$=0 cm). When the height of the foreign substance is 1 cm (ie, hs=1 cm), since the measurable minimum height h has not been reached, it may be seen that there is no remarkable change in a signal level. When the height of the foreign substance exceeds the minimum measurable height h and becomes 3 cm (ie, $h_s$=3 cm), the measurement signal is greatly reduced and almost no signal is detected. Accordingly, when a foreign substance having a height greater than the measurable minimum height h exists, the presence of the foreign substance may be confirmed through a change in signal.

Figure 25:
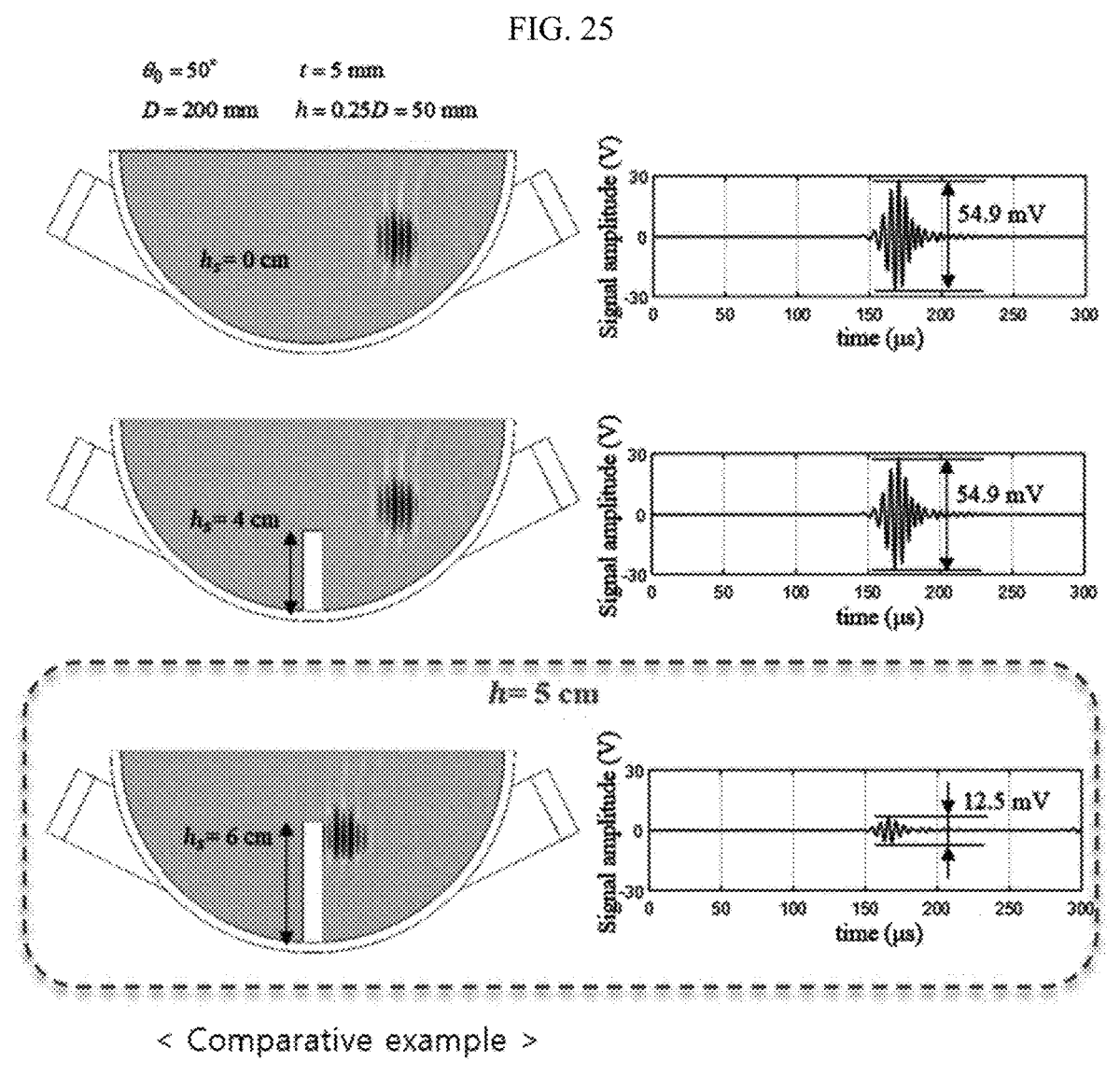

FIG. 25 is a simulation result illustrating how an output signal is changed when a foreign substance is present in a pipe in the measuring device according to a comparative example. Here, the measuring device according to the comparative example has a structure as shown in FIG. 22. At this time, the angle of incidence $\theta_0$ is 50°, the thickness t of the pipe is 5 mm, the outer diameter D of the pipe is 200 mm, and the calculated minimum measurable height h of the foreign substance was 0.25D, that is, 50 mm. In FIG. 25, $h_s$ represents the height of the actual foreign substance.

Referring to FIG. 25, it may be confirmed that a signal is normally output when there is no foreign substance (i.e., $h_s$=0 cm). When the height of the foreign substance is 4 cm (i.e., $h_s$=4 cm), it may be seen that there is no remarkable change in the signal level because the measurable minimum height h has not been reached. When the height of the foreign substance exceeds the measurable minimum height h and becomes 6 cm (i.e., $h_s$=6 cm), it may be seen that the measurement signal is greatly reduced. However, in the case of the measuring device according to this comparative example, since the measurable minimum height h of the foreign substance is high, there is a disadvantage that foreign substance having a low height may not be detected.

Figure 26:
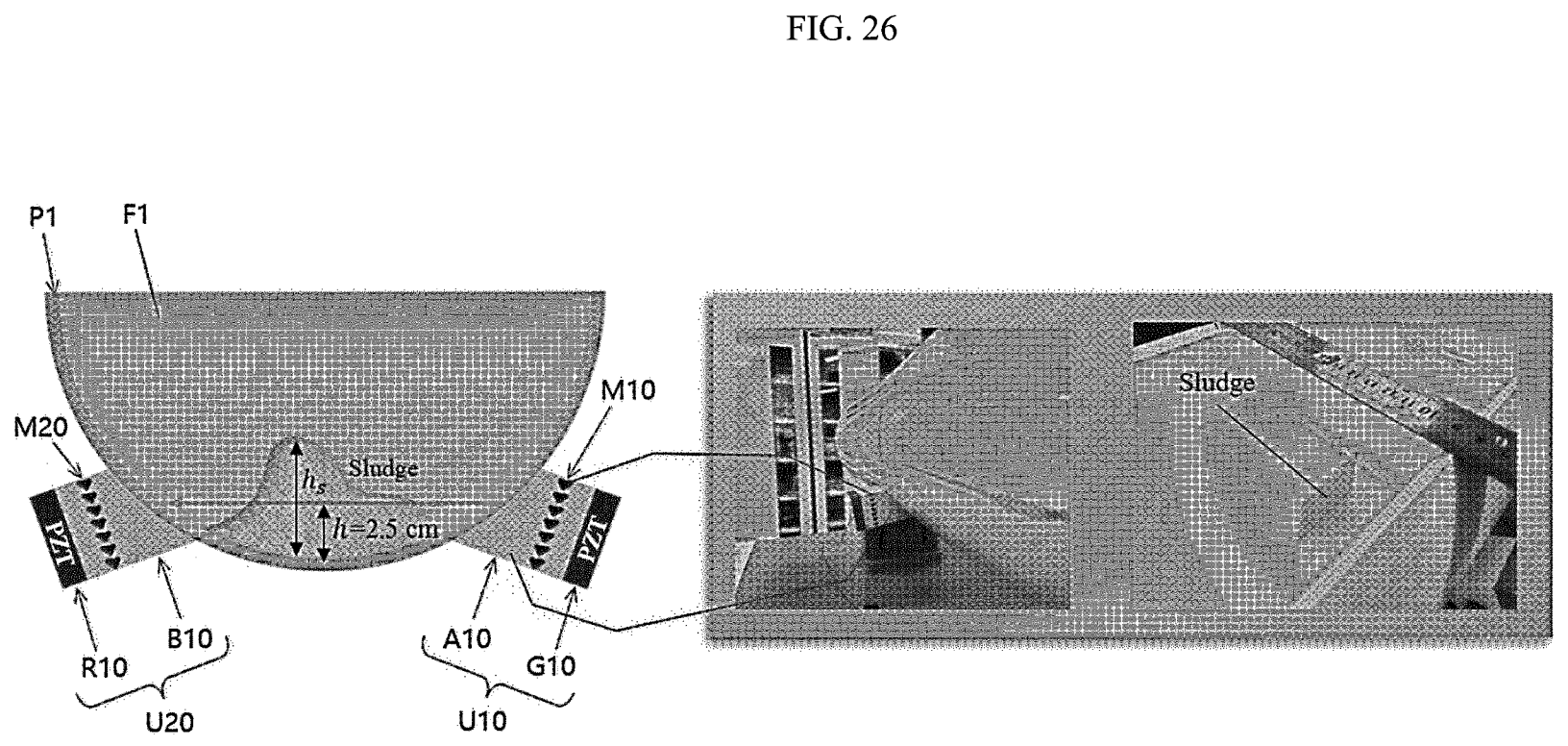
Figure 27:
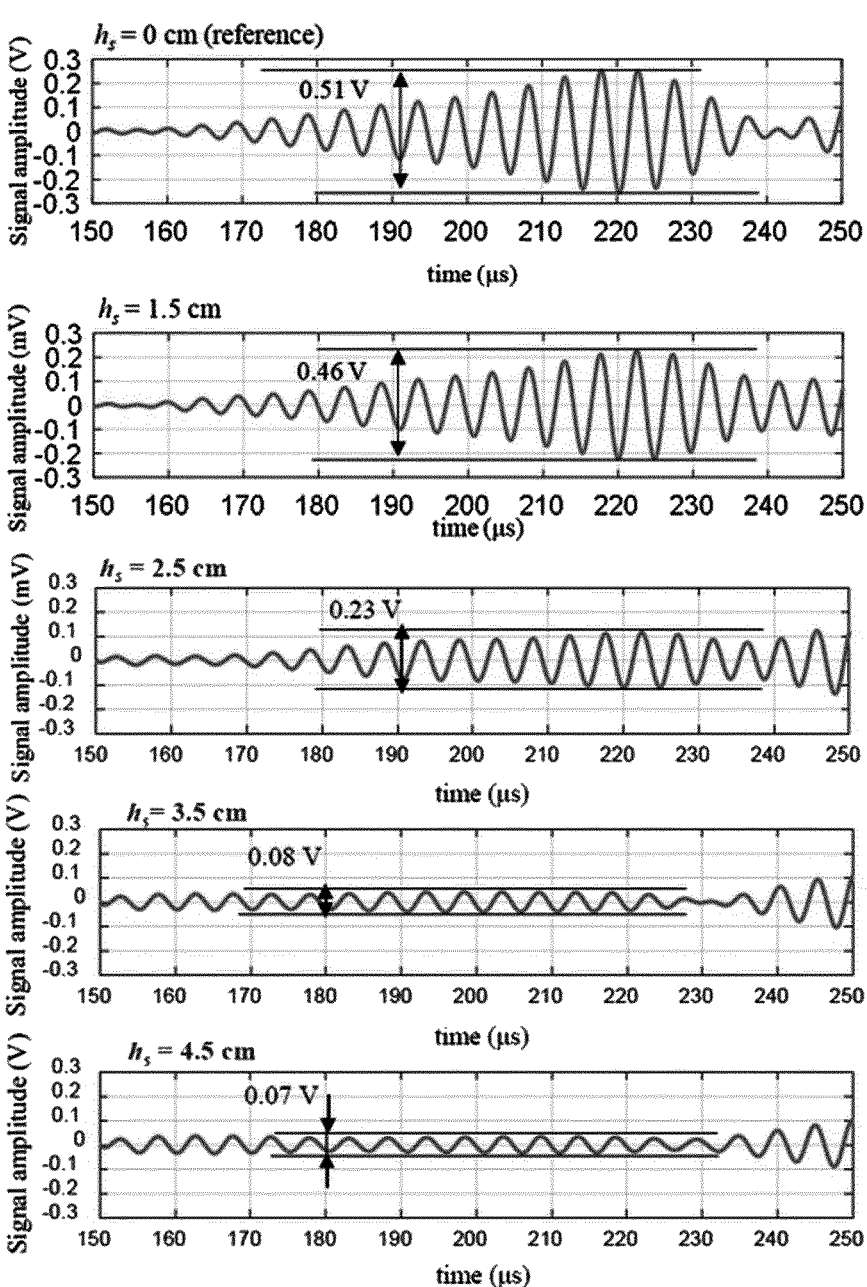

FIG. 26 and FIG. 27 are diagrams illustrating actual experimental equipment and results for measuring how an output signal is changed when a foreign substance is present in a pipe in a measuring device according to an embodiment of the present invention. Here, the measuring device according to the above embodiment has a structure as shown in FIG. 18. At this time, the angle of incidence $\theta_0$ is 30°, the thickness t of the pipe is 6.5 mm, the outer diameter D of the pipe is 216 mm, and the calculated minimum measurable height h of the foreign substance was 0.12D, that is, 25 mm. In FIG. 27, $h_s$ represents the height of the actual foreign substance.

Referring to FIG. 27, it may be seen that when the height of the foreign substance exceeds the measurable minimum measurable height h and becomes 3.5 cm and 4.5 cm (i.e., $h_s$=3.5 cm and $h_s$=4.5 cm), the output signal is greatly reduced. Accordingly, when a foreign substance having a height greater than the measurable minimum height h exists, the presence of the foreign substance may be confirmed through a change in signal.

Figure 28:
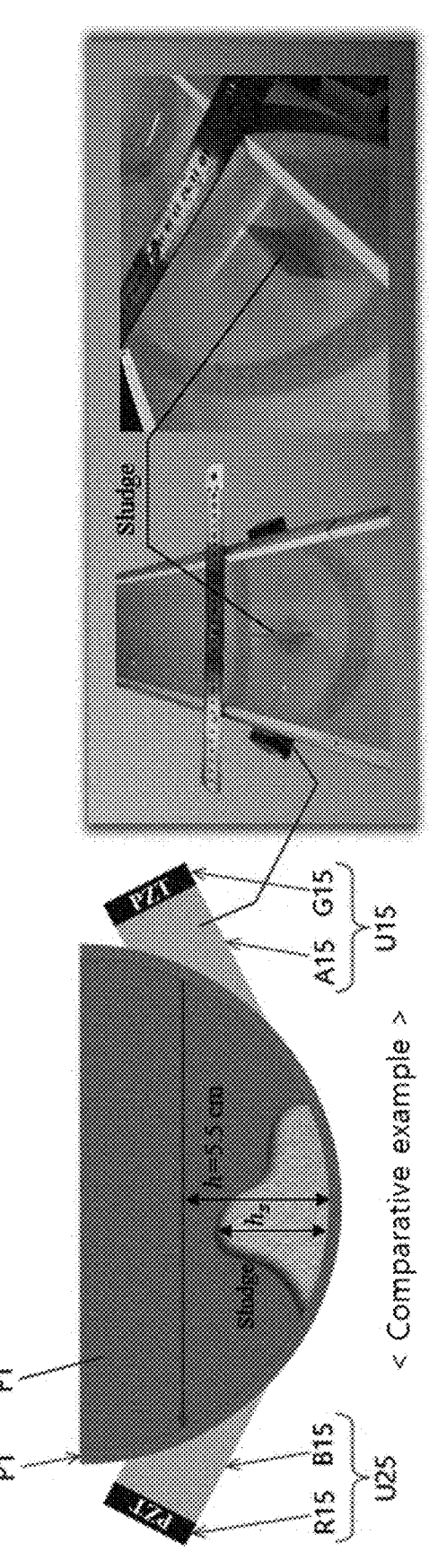
FIG. 28 and FIG. 29 are diagrams illustrating actual experimental equipment and results for measuring how an output signal is changed when a foreign substance is present in a pipe in a measuring device according to a comparative example.
Figure 29:
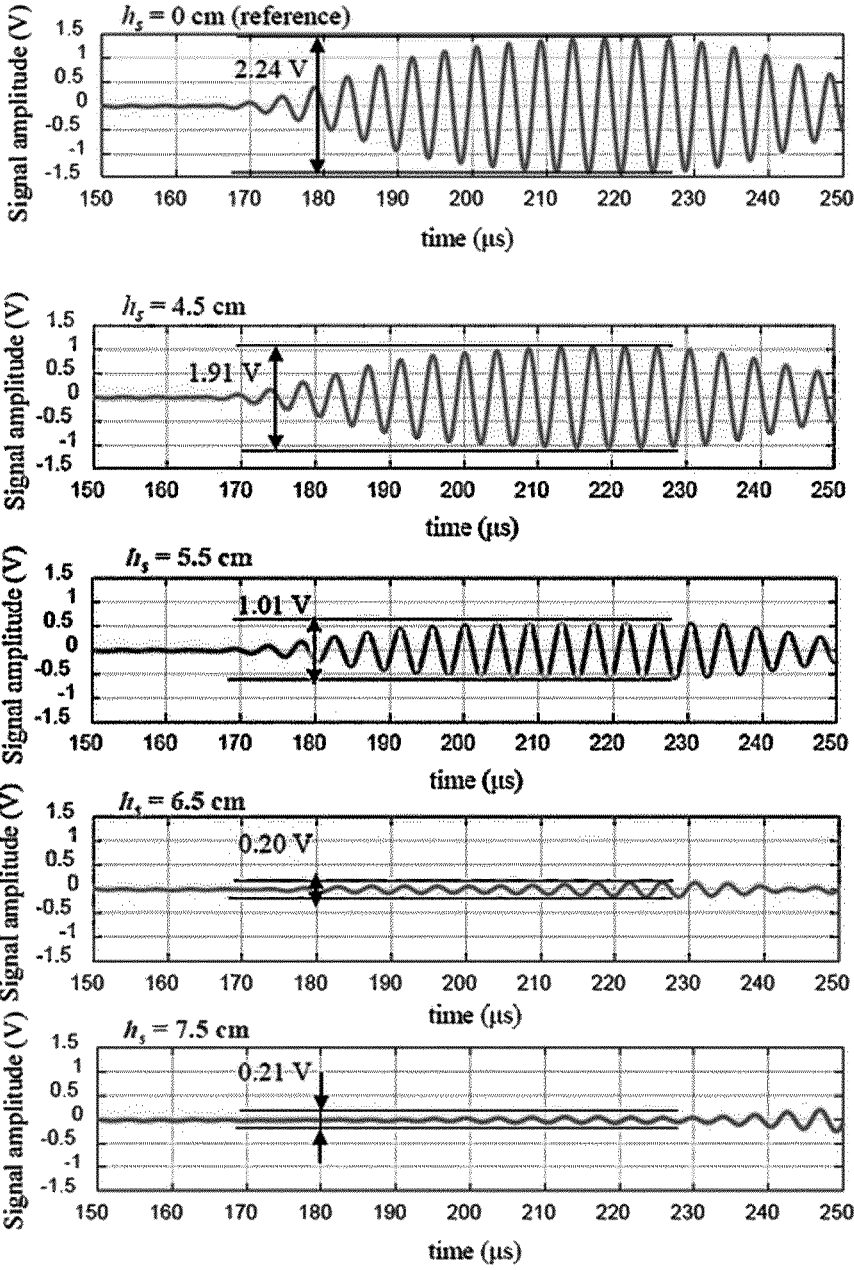

FIG. 28 and FIG. 29 are diagrams illustrating actual experimental equipment and results for measuring how an output signal is changed when a foreign substance is present in a pipe in a measuring device according to a comparative example. Here, the measuring device according to the comparative example has a structure as shown in FIG. 22. At this time, the angle of incidence $\theta_0$ is 50°, the thickness t of the pipe is 6.5 mm, the outer diameter D of the pipe is 216 mm, and the calculated minimum measurable height h of the foreign substance was 0.25D, that is, 55 mm. In FIG. 29, $h_s$ represents the height of the actual foreign substance.

Referring to FIG. 29, it may be seen that when the height of the foreign substance exceeds the measurable minimum height h and becomes 6.5 cm and 7.5 cm (i.e., $h_s$=6.5 cm and $h_s$=7.5 cm), the output signal is greatly reduced. However, in the case of the measuring device according to this comparative example, since the measurable minimum height h of the foreign substance is high, there is a disadvantage that foreign substance having a low height may not be detected.

According to the embodiments of the present invention described above, it is possible to implement a measuring device capable of measuring the height of the foreign substance in the pipe in a non-invasive manner, to easily measuring the height of the foreign substance regardless of the type of foreign substance, and the height of the measurable foreign substance may be greatly increased, and remarkably lowering the height of the measurable foreign substance. According to this embodiment of the present invention, since various types of foreign substances in the pipe may be detected without impact or damage to the pipe, and foreign substances having a low height may be easily detected, it may be usefully applied for the maintenance and management of the pipe and facilities including the same. In addition, the structure and method according to the embodiment may be applied to the detection of foreign substance inside the pipe and other structures similar to the pipe.

In this specification, the preferred embodiments of the present invention have been disclosed, and although specific terms have been used, they are only used in a general sense to easily explain the technological content of the present invention and to help understanding the present invention, and they are not used to limit the scope of the present invention. It is obvious to those having ordinary skill in the related art to which the present invention belong that other modifications based on the technological idea of the present invention may be implemented in addition to the embodiments disclosed herein. It will be understood to those having ordinary skill in the related art that in connection with a measuring device for measuring the height of foreign substances in the pipe according to the embodiments described with reference to FIGS. 1 to 29, various substitutions, changes, and modifications may be made without departing from the technological spirit of the present invention. Therefore, the scope of the invention should not be determined by the described embodiments but should be determined by the technological concepts described in the claims.

INDUSTRIAL APPLICABILITY

The embodiments of the present invention may be used to measure the accumulation height of foreign substance in a pipe or other structure.

The invention claimed is:

1. A measuring device for measuring the height of a foreign object in a pipe comprising:

an ultrasound transmission unit including an ultrasound generator disposed in a first area of an outer surface of a pipe through which fluid passes, and generating ultrasound, and a transmission medium disposed between the ultrasound generator and the first area to transmit the ultrasound to the first area;

an ultrasound receiving unit including a receiving medium unit disposed in the second area of the outer surface of the pipe, and consisting of an ultrasound receiver, and a receiving medium disposed between the ultrasound receiver and the second area, and wherein the receiving medium unit transfers the ultrasound transmitted from the first area to the second area through the inside of the pipe to the ultrasound receiver, and the ultrasound receiver receives the ultrasound transmitted through the receiving medium unit; and a signal measurer connected to the ultrasound receiver for measuring the ultrasound signal received by the ultrasound receiver or a signal corresponding thereto, wherein the ultrasound generator is configured to generate longitudinal wave type ultrasound, and the transmission medium includes a first ultrasound type conversion unit for converting the ultrasound of a longitudinal wave type into ultrasound of a shear wave type, wherein the receiving medium unit includes a second ultrasound type conversion unit for converting shear type ultrasound into longitudinal type ultrasound, wherein the height of the foreign object in the pipe is determined based on a transmission angle ($\theta_2$) in a fluid within the pipe, a thickness (t) of the pipe, and an outer diameter (D) of the pipe, wherein the transmission angle ($\theta_2$) in the fluid within the pipe is determined by at least one of a shear wave velocity ($C_{S1}$) in the pipe, a longitudinal wave velocity ($C_{L2}$) in the fluid, and an incidence angle ($\theta_{12}$) from the pipe to the fluid.

2. The measuring device for measuring the height of a foreign object in a pipe of claim 1, wherein the height of the foreign object in the pipe is determined by Equation A or Equation B below:

$$\theta_{11} = \sin^{-1}\left(\frac{c_{S1}}{c_{S0}}\sin(\theta_0)\right) \quad \text{[Equation A]}$$

$$\theta_{12} = \sin^{-1}\left(\frac{D/2}{D/2 - t}\sin(\theta_{11})\right)$$

$$\theta_2 = \sin^{-1}\left(\frac{c_{L2}}{c_{S1}}\sin(\theta_{12})\right)$$

$$h = \frac{D - t}{2}(1 - \sin(\theta_2))$$

$$\theta_{11} = \sin^{-1}\left(\frac{c_{L1}}{c_{L0}}\sin(\theta_0)\right) \quad \text{[Equation 2]}$$

$$\theta_{12} = \sin^{-1}\left(\frac{D/2}{D/2 - t}\sin(\theta_{11})\right)$$

$$\theta_2 = \sin^{-1}\left(\frac{c_{L2}}{c_{L1}}\sin(\theta_{12})\right)$$

$$h = \frac{D - t}{2}(1 - \sin(\theta_2))$$

Wherein $\theta_0$ is an incident angle from the transmitting medium unit to the pipe, $\theta_{11}$ is a transmission angle in the pipe, $\theta_{12}$ is an incident angle from the pipe to a fluid, $\theta_2$ is a transmission angle in the fluid, t is a thickness of the pipe, D is an outer diameter of the pipe, $C_{S0}$ is a shear wave velocity in the transmitting medium unit, $C_{si}$ is a shear wave velocity in the pipe, and $C_{L2}$ is a longitudinal wave velocity in the fluid (water).

3. The measuring device for measuring the height of a foreign object in a pipe of claim 2, wherein the first ultrasound type conversion unit includes a meta-structure having a unit pattern structure.

4. The measuring device for measuring the height of a foreign object in a pipe of claim 3, wherein the cross-section of the unit pattern structure has a modified triangular shape in which three vertex areas are rounded or a Z-shape or a segmented pattern shape including first and second pattern portions spaced apart from each other and a third pattern portion disposed spaced apart therebetween.

5. The measuring device for measuring the height of a foreign object in a pipe of claim 3, wherein the unit pattern structure may include a through-hole area formed in the transmission medium unit.

6. The measuring device for measuring the height of a foreign object in a pipe of claim 2, wherein the receiving medium unit includes a second ultrasound type conversion unit for converting shear type ultrasound into longitudinal type ultrasound.

7. The measuring device for measuring the height of a foreign object in a pipe of claim 6, wherein the second ultrasound type conversion unit may include a meta-structure having a unit pattern structure.

8. The measuring device for measuring the height of a foreign object in a pipe of claim 1, wherein the ultrasound generator is configured to generate ultrasound of a shear wave type.

9. The measuring device for measuring the height of a foreign object in a pipe of claim 8, wherein at least one of the transmission medium unit and the receiving medium unit is entirely made of a uniform medium substance.

10. The measuring device for measuring the height of a foreign object in a pipe of claim 1, wherein the transmission medium unit has a first wedge structure having a first curved area corresponding to the curved surface of the first area, and the receiving medium unit has a second wedge structure having a second curved area corresponding to the curved surface of the second area.

11. The measuring device for measuring the height of a foreign object in a pipe of claim 1, wherein the transmitting medium unit and the receiving medium unit are disposed symmetrically with respect to the pipe, and are disposed to form an interior angle smaller than about 180° in a downward direction of the pipe with setting the pipe as a center.

12. The measuring device for measuring the height of a foreign object in a pipe of claim 1, wherein the pipe includes a first plastic substance, and at least one of the transmission medium unit and the receiving medium unit includes a second plastic substance.

13. The measuring device for measuring the height of a foreign object in a pipe of claim 12, wherein the second plastic substance includes polyether ether ketone (PEEK).

14. The measuring device for measuring the height of a foreign object in a pipe of claim 1, wherein the ultrasound generator includes a piezoelectric element for converting an electrical signal into an ultrasound signal.

15. The measuring device for measuring the height of a foreign object in a pipe of claim 1, wherein the ultrasound receiver includes a piezoelectric element for converting an ultrasound signal into an electrical signal.

16. The measuring device for measuring the height of a foreign object in a pipe of claim 10, wherein the transmitting medium unit and the receiving medium unit are disposed symmetrically with respect to the pipe, and are disposed to form an interior angle smaller than about 180° in a downward direction of the pipe with setting the pipe as a center.

* * * * *